United States Patent [19]

Almulla

[11] Patent Number: 5,727,046
[45] Date of Patent: Mar. 10, 1998

[54] PERSONAL ELECTRONIC TELEPHONE DIRECTORY APPARATUS WITH REMOTE ACCESSIBILITY

[76] Inventor: Waleed S. Almulla, 16948 NW. Countryridge Dr., Portland, Oreg. 97229

[21] Appl. No.: 570,320

[22] Filed: Dec. 11, 1995

[51] Int. Cl.[6] .............................. H04M 1/50; H04M 1/64
[52] U.S. Cl. .................. 379/88; 379/77; 379/213; 379/355
[58] Field of Search ................. 379/67, 88, 89, 379/354, 355, 216, 214, 199, 189, 159, 160, 213, 74, 77

[56] References Cited

U.S. PATENT DOCUMENTS

| | | | |
|---|---|---|---|
| 4,117,542 | 9/1978 | Klausner et al. | 379/355 |
| 4,304,968 | 12/1981 | Klausner et al. | 379/354 |
| 4,608,460 | 8/1986 | Carter et al. | 379/71 |
| 4,633,041 | 12/1986 | Boivie et al. | 379/355 |
| 4,782,509 | 11/1988 | Shepard | 379/88 |
| 4,800,582 | 1/1989 | D'Agosto, III et al. | 379/216 |
| 4,924,496 | 5/1990 | Figa et al. | 379/199 |
| 5,204,894 | 4/1993 | Darden | 379/88 |
| 5,230,023 | 7/1993 | Nakano | 379/67 |
| 5,339,354 | 8/1994 | Becker et al. | 379/67 |
| 5,369,685 | 11/1994 | Kero | 379/67 |
| 5,406,618 | 4/1995 | Knuth et al. | 379/67 |
| 5,432,844 | 7/1995 | Core et al. | 379/67 |
| 5,436,963 | 7/1995 | Fitzpatrick et al. | 379/214 |
| 5,452,340 | 9/1995 | Engelbeck et al. | 379/355 |
| 5,454,029 | 9/1995 | Noda | 379/216 |
| 5,454,035 | 9/1995 | Oba et al. | 379/216 |
| 5,483,581 | 1/1996 | Hird et al. | 379/132 |
| 5,483,586 | 1/1996 | Sussman | 379/316 |

*Primary Examiner*—Thomas W. Brown
*Attorney, Agent, or Firm*—Gregory T. Kavounas

[57] ABSTRACT

A stand alone Personal Electronic Telephone Directory (PETD) apparatus is provided, that includes an internal telephone line segment, an off hook circuit, a Dual Tone Multi-Frequency (DTMF) receiver, a ring detection circuit, a micro-controller, a memory, a speech synthesizer, and a DTMF generator. The PETD apparatus is a stand alone device intended for connection to an individual user's home telephone line, and for access by using a common touch tone ("DTMF") telephone. The user can access the memory of the PETD apparatus of the present invention locally or remotely. Then the user can issue coded instructions by simply pressing the keys of the DTMF telephone. By giving specific instructions, the user is allowed to add, retrieve or delete data from the memory of the PETD apparatus. The PETD apparatus communicates with the user by voice, generated by the speech synthesizer. Additionally, if the PETD apparatus is being accessed locally, then the user can instruct it to dial automatically the telephone number retrieved from the memory, so that the user can continue automatically with a telephone call to the retrieved telephone number.

15 Claims, 13 Drawing Sheets

PERSONAL ELECTRONIC TELEPHONE DIRECTORY APPARATUS WITH REMOTE ACCESSIBILITY

BACKGROUND OF THE INVENTION

1. Field of the Invention

The present invention relates to special, enhanced electronic telephone directories, and particularly to a method and apparatus for providing a stand alone personal electronic telephone directory apparatus with local and remote accessibility.

2. Description of the Prior Art

A telephone directory is a system that accepts an inquiry of a name, and then responds by giving the telephone number of that name. There have been numerous and varied proposals for providing remotely accessible telephone directories through central office based systems and services. These systems and services generally comprise arrangements for making inquiries of telephone number data through the keypad of a standard "touch tone" telephone device, otherwise known as Dual Tone Multi Frequency (DTMF) telephone device.

U.S. Pat. No. 4,782,509 to Shepard discloses an automatic directory assistance request processor system, usable over a large geographic area. The user seeking directory information enters the name of the requested number by pressing the appropriate telephone keypad keys. Shepard's system converts the DTMF signal to digital data, and then searches for database data matching the requested data. The search is over data contained in a plurality of local exchanges. The system provides vocal outputs generated by a speech synthesizer. The voice responds by identifying the name and number of the sought party. In this system the user can only search for data existing in the system. The user can not delete or add personal data to the system through the DTMF telephone keypad.

U.S. Pat. No. 4,608,460 to Carter et al. describes an automatic directory assistance apparatus accessed through a conventional telephone exchange. It receives DTMF input signals and responds via voice synthesis. The subscriber spells at least a part of the desired last name. The system will search for the inquired name and will respond by saying the found names and their corresponding numbers. This system is limited by being able to retrieve only data that has been stored in it by the system. The user does not have the ability to delete or add data to the system through the telephone exchange.

U.S. Pat. No. 5,204,894 to Darden is directed to a personal electronic service that is administered by a central office. The service can provide a user with the ability to remotely store, retrieve and/or delete voice data from a telephone directory account that is personal to the user, and provided by the central office. In such arrangements, the user would pay a monthly fee for having a personal account, and possibly other charges based on use. A user must also hope that the service is offered close enough to her, where calling the central office would be charged as a local call. Further, even for setting up her personal directory in her account, the user would incur charges for her time on the telephone, unless the service has been set up with an "800" number that reverses the charges.

While all of the foregoing systems theoretically can provide electronic telephone directories with remote accessing, they individually suffer varying disadvantages. For example, some of these systems can not be updated by the subscriber to store personal data. They all are complex expensive systems that require a significant investment to set up, complex equipment and expensive computers. Because of the nature and complexity of the described systems, it would be difficult for them to provide remotely accessible personal electronic telephone directories to each individual requiring such a feature for a reasonably low cost. Further, it would be prohibitively expensive for an individual or a small entity to own one of the described systems for private use. Finally, since all such systems are remotely operated, the user depends absolutely on the provider of a service.

U.S. Pat. No. 5,454,029 to Noda describes a telephone answering machine with a telephone directory function. The directory function has been implemented by using the equivalent of a speed dialing function, wherein the names of the directory are stored in the memory in association with an abbreviated code assigned by the device. The code is a two digit serial number, and can be the speed dialling code. Each telephone number is stored in correspondence with the code associated with the name. Using an external telephone, a user can form an inquiry for the telephone number by entering its associated code. A drawback of this device is that the user must either remember the code or be able to verify it independently by a pocket book, that he must carry with him. Once required to carry a pocket book, the user might as well record the telephone numbers in it. Alternately, the user can instruct the device to recite all the stored names serially through the telephone line. Once the desired name is spoken, the user can issue another command to have the device also recite the corresponding telephone number. The device suffers from a serious limitation based on its design. Because reciting of the entries is in a serial fashion, the number of entries is practically limited; indeed, the preferred embodiment accommodates only 50 entries. If the name happens to be the fortieth stored, the user will first have to listen to 39 other names first. Worse, if the name happens to not be stored at all, then the user will have to listen to all 50 to discover this, without accomplishing anything else in the meantime. So, while implementing the device for a higher number of entries is easily possible, it also makes searching the memory of the device more time consuming.

SUMMARY OF THE INVENTION

It is a primary object of the present invention to provide a personal electronic telephone directory apparatus to telephone subscribers as a stand alone device that has names and telephone numbers stored in its directory, and utilizes speech synthesis to respond to its users vocally.

It is another object of the present invention to provide a personal electronic telephone directory apparatus that allows a user to store, retrieve, or delete personal data to it by following simple procedures.

It is yet another object of the present invention to provide a personal electronic telephone directory apparatus with remote accessibility that can be connected to a conventional home telephone line and used without the need for any services from a central office.

It is one more object of the present invention to provide a stand alone personal electronic telephone directory apparatus that can be connected to a conventional home telephone line while also permitting simultaneous connection of other devices to the same home telephone line.

It is another object of the present invention to provide an efficient low cost personal electronic telephone directory apparatus with local and remote accessing features that can be owned and used by any individual or small entity for a reasonably low cost.

It is yet another object of the present invention to provide a personal electronic telephone directory apparatus wherein telephone number data can be added, deleted, or retrieved locally (i.e. from home), or remotely (i.e. from away from home) using a conventional touch tone telephone.

It is one more object of the present invention to provide a user with a personal electronic telephone directory apparatus that can dial automatically a retrieved telephone number, and permit automatically a subsequent telephone communication of the user with the retrieved telephone number.

According to the present invention, a stand alone Personal Electronic Telephone Directory (PETD) apparatus includes an internal telephone line segment, an off hook circuit, a Dual Tone Multi Frequency (DTMF) receiver, a ring detection circuit, a micro-controller, a memory, a speech synthesizer, and a DTMF generator.

The PETD apparatus of the present invention is a stand alone device intended for connection to an individual user's home telephone line, and for access by using a common touch tone ("DTMF") telephone. The PETD apparatus further allows connection of other telephonic devices, such as a FAX machine or a telephone answering machine to the same home telephone line. The intended connections are such that, unless specifically accessed, the PETD apparatus does not interfere with the normal operation of the telephone or the other telephonic devices.

The user can access the memory of the PETD apparatus of the present invention locally or remotely. Then the user can issue coded instructions by simply pressing the keys of the DTMF telephone. By giving specific instructions, the user is allowed to add, retrieve or delete data from the memory of the PETD apparatus. The PETD apparatus communicates with the user by voice, generated by the speech synthesizer.

As an additional feature, if the PETD apparatus of the present invention is being accessed locally, then the user can further instruct it to dial automatically the telephone number retrieved from the memory, so that the user can continue automatically with a telephone call to the retrieved telephone number.

The PETD of the present invention is advantageous over the prior art because it can store data that is not retrievable from existing directory assistance services. This is especially useful for an individual that has nation wide or world wide contacts, or for storing telephone numbers that are unlisted.

Additionally the PETD apparatus of the present invention eliminates the need and inconvenience of carrying pocket telephone directories or any other type of telephone directories. The PETD apparatus can be accessed by DTMF telephone calling from a different area code, or even a different country. Thus it eliminates the risk of losing a portable telephone directory that could have important data. The remote accessibility of the PETD is especially important for individuals in transit.

The PETD apparatus of the present invention is user friendly, easy to use, and as convenient as using the closest DTMF telephone. It provides privacy, since all the data is stored in a privately owned apparatus at home, which further needs access codes to be accessed. It does not require any special equipment or services from a central office, as it can be plugged in to an existing home telephone line. Use of the preferred embodiment of the present invention does not preclude one of the telephone outlets of the subscribing user's home from being used, because it allows connection of additional equipment to it, such as telephones, answering machines, FAX machines, modems, etc.

These and other objects and advantages of the present invention will be more appreciated and understood after a consideration of the following drawings and the detailed description of the invention.

BRIEF DESCRIPTION OF THE DRAWINGS

In all Figures like numbers are used for like components where applicable.

DETAILED DESCRIPTION OF THE INVENTION

Figure 1:
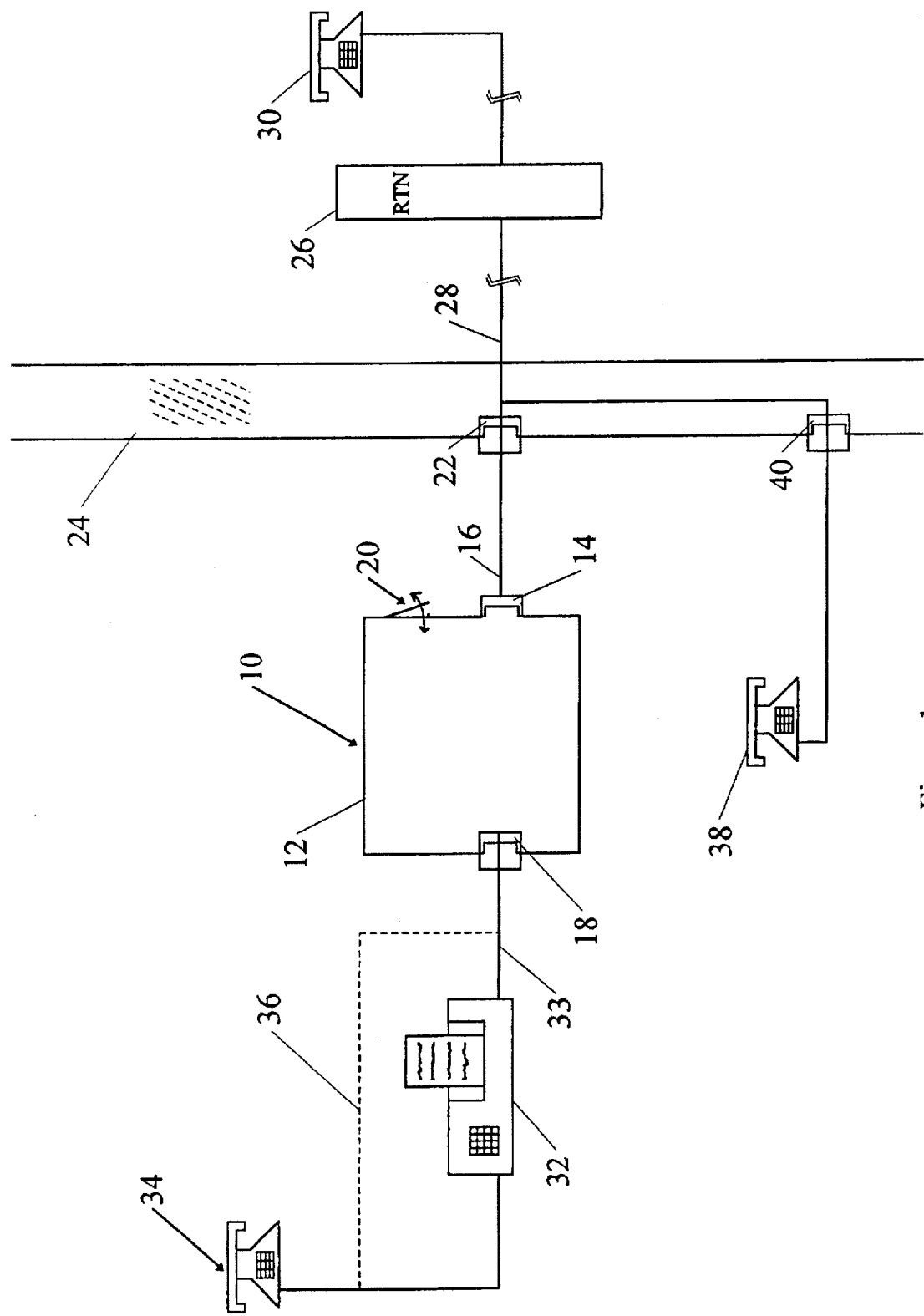
FIG. 1 is an illustration of possible connections for the preferred embodiment of the present invention.

Two main embodiments of the present invention will be described. The preferred embodiment of the present invention is a stand alone Personal Electronic Telephone Directory ("PETD") apparatus, and will be described first, in connection with FIGS. 1–10. An alternate embodiment of the present invention is a stand alone Caller Only PETD ("COPETD") apparatus, and will be described in connection with FIGS. 11–12.

PETD—Connections

The types of possible connections of the stand alone Personal Electronic Telephone Directory (PETD) apparatus of the present invention will now be described in reference with FIG. 1. The preferred embodiment of the present invention is represented by box 10, and will now be called PETD apparatus 21.0 for short. The PETD apparatus 10 of the present invention is preferably provided in its own enclosure 12, that features a male telephone port 14. The male telephone port 14 is also known as the caller port 14, because it is intended for users calling in to the PETD apparatus 10. A line cable 16 is preferably connected to the male telephone port 14. The male telephone port 14 can be implemented in many ways without departing from the meaning or the spirit of the present invention. One such way is to have it be a female type telephone plug, with line cable 16 terminating in two male-type plugs. Another such way is to have the male telephone port 14 be internal to the enclosure 12, with the line cable 16 again terminating in two male-type plugs, and apparently sourcing from the enclosure 12.

The PETD apparatus 10 is further provided with a female telephone port 18. The female telephone port 18 is also known as the proximate port 18, because it is intended for users located proximately to the PETD apparatus 10. The female telephone port 18 is like a female type telephone plug or outlet. The stand alone PETD apparatus 10 is additionally provided with a ring detection switch 20, that is an Open—Close (ON-OFF) type switch.

The line cable 16 is intended for connection to the telephone outlet 22, provided on a wall 24 of the home of a subscriber. The telephone outlet 22 is electrically connected to a Remote Telecommunication Network (RTN) 26 via a home telephone line 28. The RTN 26 is typically a switchboard or a network or a telephone exchange, such as one operated by a telephone company. The home telephone line 28 is the means of telephone access to the subscriber by remotely located telephones, such as telephone 30. The home telephone line 28 has a number assigned to the subscriber (and user of the PETD) by the telephone company.

While the present description refers to the PETD apparatus 10 being located in the user's home, such is by way of illustration and not of limitation. Indeed, the user can install the apparatus of the present invention in other places such as his office, at the telephone outlet of a telephone line that reaches there.

The user preferably makes the remaining connections as if the female telephone port 18 of the PETD apparatus 10 were the outlet 22 of the home telephone line 28. Specifically, the subscriber may connect a telephonic device 32 such as a FAX machine 32 to the female telephone port 18 via a proximate telephone cord 33, and a conventional DTMF telephone 34 to a female telephone port of the telephonic device 32. Alternately, the user may connect the DTMF telephone 34 directly to the female telephone port 18 of the PETD apparatus 10, via another proximate telephone cord 36. This way, use of the PETD apparatus 10 will not be precluding any of the available home telephone outlets from being used by other telephonic devices.

According to the present description, a telephonic device is a device capable of detecting telephone rings of a home telephone line that it is connected to, and further capable of taking the home telephone line to an off hook state automatically. The connection can be direct (e.g. to an outlet of the home telephone line 28) or indirect (e.g. through another telephonic device). Examples of such telephonic devices are, therefore, telephone answering machines, FAX machines, modems, etc. Telephones are not within this definition of telephonic devices, because they can not take a home telephone line to its off hook state automatically.

When on standby mode, the above described connections make the PETD apparatus 10 of the present invention appear "transparent" to a user of the telephonic device 32, or a user of the telephone 34, regardless of which party originated the connection. A local user using one of these two devices with the connections of FIG. 1 is termed a proximate user, since he is accessing the PETD 10 through its proximate port 18. Caller access of the PETD 10 can also be accomplished locally through another conventional DTMF telephone device 38, connected to another outlet 40 of the home telephone line 28. It is caller access because the PETD 10 will be accessed by its caller port 14. Such caller access is local access, because it originates from the home of the user.

In addition to these connections, the user would also determine whether to open or close ring detection switch 20. The user makes that determination based on whether a telephonic device is also connected to the home telephone line 28. The switch should be normally closed, unless a telephonic device is connected to the proximate port 18 of the PETD apparatus 10 or to any outlet (e.g. 22, 40) of the home telephone line 28.

PETD—Components

Figure 2:
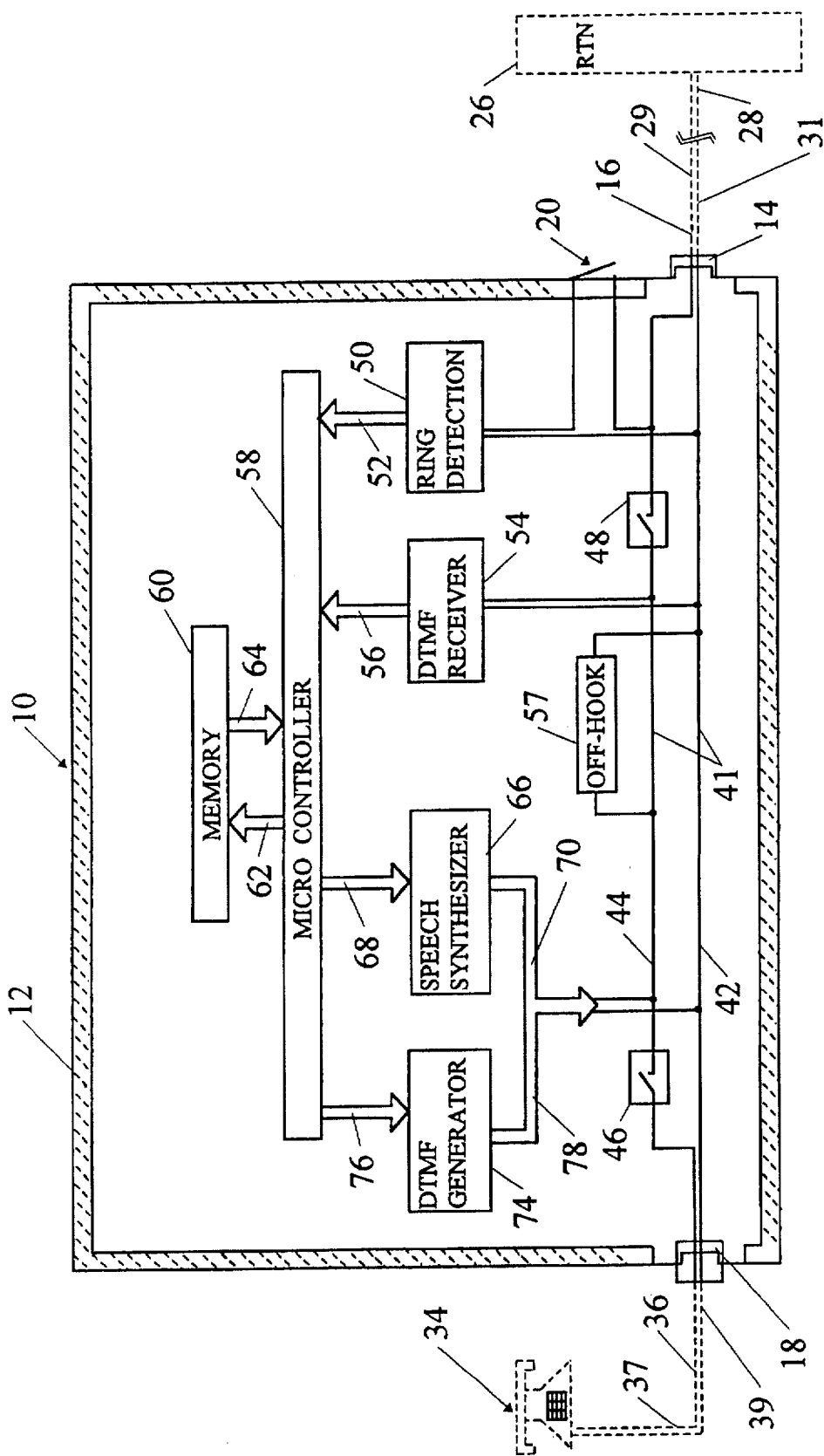
FIG. 2 is a diagrammatic illustration of components of the preferred embodiment of the present invention.

The main components of the PETD apparatus 10 of the present invention will now be described in connection with FIG. 2. In FIG. 2 the single lines show single electrical lines, while the wide arrows show abstractly the flow of commands and of data.

The PETD apparatus 10 of FIG. 2 is assumed to be connected to the RTN 26 through line cable 16 and home telephone line 28. Line cable 16 is actually a pair of electrical lines, of which individual line 29 is the signal line and individual line 31 is the common line. Additionally, the PETD apparatus 10 is assumed to be connected directly to DTMF telephone 34, through proximate telephone cord 36. Proximate telephone cord 36 is actually a pair of electrical lines, of which individual line 37 is the signal line and individual line 39 is the common line. As will be understood, these specific connections have been assumed with no loss of generality, and other connections are possible.

The PETD apparatus 10 comprises an internal telephone line segment 41, comprised by a pair of electrical wires 42 and 44, otherwise known as common line 42 and signal line 44. Common line 42 is a common node for the Vss of the circuit of the PETD apparatus 10, for the home telephone line 28 (i.e. line 31), and also for the DTMF telephone 34 (i.e. line 39). Line 42 joins the female telephone port 18 and the male telephone port 14. Signal line 44 has a proximate end connected to relay 46 and a caller end connected to relay 48. The proximate end is configured so that it is capable of establishing a proximate connection of the internal telephone line segment 41 with the proximate telephone cord 36. The caller end is configured so that it is capable of establishing a caller connection of the internal telephone line segment 41 with the line cable 16. The configuration of the ends is preferably in the form of common telephone plugs or outlets, so that connections can be made by simply plugging in, as follows.

A short wire or extended node joins relay 46 with female telephone port 18, and another short wire or extended electrical node joins relay 48 with male telephone port 14. A node is a place of connection of electrical wires. A node can be extended (i.e. a wire can be a node) without loss of generality. When relay 46 closes, a proximate connection is made between the internal telephone line segment 41 and the proximate telephone cord 36 that is connected to the telephone device 34. The proximate connection is accomplished by closing and opening the relay 46, which electrically connects and disconnects only the respective signal lines 37 and 44, but that is all that matters. The common lines 39, 42 are always connected during operation. This way the internal telephone line segment 41 becomes capable of receiving DTMF signals that have been applied to the proximate telephone cord 36 by a proximate caller. Similarly, when relay 48 closes, a caller connection is made between the internal telephone line segment 41 and the line cable 16 that is connected to the home telephone line 28. This way the internal telephone line segment 41 becomes capable of receiving DTMF signals that have been applied to the home telephone line 28 by a caller.

The aforementioned "transparent" operation of the DTMF telephone 34 with the home telephone line 28 "through" the PETD apparatus 10 is allowed when both the relays 46 and 48 are closed, and thus the signal line 44 connects the signal line 29 to the signal line 37. Such is the case when the PETD apparatus 10 is in the standby mode.

When the subscriber number corresponding to the home telephone line 28 is being dialled by a caller, characteristic voltage differences will appear on the line cable 16. A ring detection circuit is a circuit capable of detecting them, and it is further capable of producing a ring detection signal in response. This ring detection signal is intended to activate a mechanism that will take the home telephone line 28 to its off hook state. For proper implementation of the PETD apparatus 10, it is thus important to have a ring detection circuit connected somewhere in the system. Such can be implemented in many ways. One way is for the PETD apparatus 10 to rely indirectly on ring detection circuits of connected devices (telephones or telephonic devices). In such a case the PETD apparatus 10 need not have its own. Another way is to use the ring detection circuit of a telephonic device that has been manufactured in conjunction with a PETD apparatus.

According to the preferred embodiment of the present invention, the PETD apparatus 10 has its own ring detection circuit 50. The ring detection circuit 50 has an input port and an output port. The input port is capable of connection with the line cable 16. This is accomplished by having a common line of the input port of the ring detection circuit 50 be connected to common line 42, and by further having a signal line of the input port of the ring detection circuit 50 be connected to the extended node between relay 48 and the male telephone plug 14. Thus, in the shown embodiment, the connection between the input port of the ring detection circuit 50 and the line cable 16 happens when the line cable 16 is connected to the male telephone plug 14. A ring detection signal is produced at the output port that carries ringing information (i.e. number of rings) and is signified by wide arrow 52.

If a telephonic device is connected to the home telephone line 28, then the ring detection circuit 50 of the PETD apparatus 10 is actually undesirable, because it may interfere with the telephonic device by answering simultaneously with it. There are two solutions to this problem. First, to have the PETD apparatus 10 respond to the ring detection circuit 50 only after a number of rings that is large enough (e.g. 5), to where the telephonic device will hopefully have answered first. Such will be accomplished by the algorithm, as will be seen below. The second solution is to use a switch so that the ring detection circuit 50 can be disabled entirely. Accordingly, the stand alone PETD apparatus 10 optionally and preferably comprises a ring detection switch 20. The ring detection switch 20 is connected to the input port of the ring detection circuit 50 and to line cable 16. When the ring detection switch 20 is closed (ON), then the ring detection circuit 50 is enabled, and produces a ring detection signal. When the ring detection switch 20 is open (OFF), then the ring detection circuit 50 is disabled, and produces no output.

The PETD apparatus 10 additionally comprises a DTMF receiver 54, that has an input port and an output port. The input port is connected to the internal telephone line segment 41. DTMF signals coming from a remote caller can be applied to the internal telephone line segment 41 only when the home telephone line 28 is in its off hook state. The DTMF receiver 54 produces electronic signals at the output port, in response to DTMF signals detected at its input port. The electronic signals are binary data, whose flow is shown by wide arrow 56.

The PETD apparatus 10 also comprises an off hook circuit 57. The off hook circuit 57 is connected to the signal line 44 and to the common line 42. When activated, the off hook circuit 57 connects the signal line 44 with the common line 42 over electrical resistance. That will have the effect of taking the home telephone line 28 to an off hook state. An LED (not shown in FIG. 2) will simultaneously be lit to indicate that.

The PETD apparatus 10 further comprises a microcontroller 58. The microcontroller 58 acts as a central processor for all electronic components, and for the flow of commands and data within the circuit of the PETD apparatus 10. The microcontroller 58 is connected to the output port of the ring detection circuit 50, and thus monitors the ring detection signal, when the ring detection switch 20 is closed. The microcontroller 58 is capable of establishing and disestablishing the proximate connection and the caller connection by opening and closing relays 46 and 48. Further, the microcontroller 58 can activate and deactivate the off hook circuit 57.

The microcontroller 58 is connected to the output port of the DTMF receiver 54, and can thus perceive the electronic signals whose flow is represented by wide arrow 56. The microcontroller 58 is programmed in such a way that it is capable of interpreting the electronic signals as encoded instructions and encoded data. The exact implementation will be obvious to a person skilled in the art, in view of the present description.

The PETD apparatus 10 further comprises a memory 60. The memory 60 is capable of storing telephone number data, in manners which will be elaborated on below. The microcontroller 58 is connected and programmed in such a way that it is capable of retrieving, adding and deleting telephone number data from the memory 60, in accordance with the encoded instructions and the encoded data received. In particular, the microcontroller 58 stores (wide arrow 62) and retrieves (wide arrow 64) telephone number data from memory 60.

The PETD apparatus 10 also comprises a speech synthesizer 66, that has an input port and an output port. The input port is connected in such a way that it is capable of perceiving telephone number data that has been retrieved from the memory 60 by the microcontroller 58. Further as a result of instruction signals received, the microcontroller 58 outputs (or commands a memory element such as a latch to output) telephone number data and perhaps other information (wide arrow 68) to speech synthesizer 66. The speech synthesizer 66 is capable of producing at its output port electronic speech signals in response to telephone number data perceived at its input port. The output port of the speech synthesizer 66 is connected to the internal telephone line segment 41 through an audio transformer (not shown in FIG. 2) that will be elaborated on below. Accordingly, the electronic speech signals can be applied (wide arrow 70) to the internal telephone line segment 41 as voice signals, which would be heard at the DTMF telephone device, that was used to issue inputs. The voice signals are vocal renditions of the perceived telephone number data, or of other information such as announcements, menus, etc.

Optionally and preferably the PETD apparatus 10 further comprises a DTMF generator 74, that has an input port and an output port. The input port is connected to the microcontroller 58. According to the preferred embodiment, the microcontroller 58 is further programmed in such a way that it is capable of issuing (or of causing a memory element such as a latch to issue) dial commands (wide arrow 76). The input port of the DTMF generator 74 is capable of perceiving the dial commands. The output port of the DTMF generator 74 is connected to the internal telephone line segment 41. The DTMF generator 74 is capable of generating DTMF dial signals at its output port in response to dial commands perceived at its input port. The dial signals are thus applied (wide arrow 78) to the internal telephone line segment 41, again through the audio transformer.

PETD—Operation

The operation of the stand alone PETD apparatus 10 will now be described in reference with FIGS. 1 and 2. The operation is intertwined with the software algorithm that will be used. A preferred (but not unique) algorithm is described in the next section.

When on standby mode, the PETD apparatus 10 maintains both proximate and caller connections established. Thus it allows "transparent operation", unless accessed specifically. The standby mode will not prevent the home telephone line 28 from going to its on hook state. But when the PETD apparatus 10 goes to its off standby mode while the caller connection is being established, it will take the home telephone line 28 to its off hook state.

Given the connections of either FIG. 1 or FIG. 2, the PETD apparatus 10 can be accessed locally by the DTMF telephones 34 or 38. The user would accomplish this by simply picking up either DTMF telephone 34 or 38, and by dialling a predetermined, user definable proximate access code or a caller access code, respectively. Pressing the keys of a DTMF telephone generates DTMF signals, that will be applied to the internal telephone line segment 41. The user will thus be issuing inputs by pressing the keys of a DTMF telephone device connected to the stand alone PETD apparatus.

Alternately, the PETD apparatus of the present invention can be accessed remotely by dialling the subscriber number (or just telephone number) of the home telephone line 28 from a remote telephone device 30 that is connected to RTN 26. What happens next depends on whether the ring detection switch 20 is closed or open.

If the ring detection switch 20 is closed, then the PETD apparatus 10 monitors incoming calls through the ring detection circuit 50. When a predetermined number of rings has been detected, the PETD will answer the call by taking the home telephone line 28 to its off hook state. Thus any DTMF signals generated thereafter will be able to be applied to the internal telephone line segment 41. If the predetermined number of rings is not reached, it will be because either the caller hang up, or because a telephone or a telephonic device took the home telephone line 28 to its off hook state (in which case DTMF signals will be able to be applied to the internal telephone line segment 41.)

If the ring detection switch 20 is open, the PETD apparatus 10 will not detect the rings. So, if no other telephonic device takes the home telephone line 28 to its off hook state, then no DTMF signals can be applied to the internal telephone line segment 41, and the call will go unanswered. If telephonic device 32 takes the home telephone line 28 to its off hook state, then PETD signals will be able to be applied to the internal telephone line segment 41.

When DTMF signals appear on the internal telephone line segment 41, they will be detected by the DTMF Receiver 54, and subsequently by the microcontroller 58. The PETD 10 will then compare the DTMF signals to the two access codes. If the proximate access code has been input, then the PETD apparatus 10 will disestablish the caller connection by opening relay 48. Therefore, the connection of the PETD apparatus 10 with the home telephone line 28 to the RTN 26 will be cut off. If the caller access code has been input, then the PETD apparatus 10 will disestablish the proximate connection by opening relay 46. However, the home telephone line 28 will remain at its off hook state. In either case, the PETD apparatus 10 will then wait for further DTMF signals from the user.

It is possible that a proximate user will have given the caller access code, or that a caller will have given the proximate access code. In either case, while the code will be identified as valid, the user will thus get disconnected, by being in the wrong end.

The user will be in position to access the memory of the PETD apparatus 10 of the present invention by using the keypad of the DTMF telephone device she is using, whether locally or remotely. By sending instructions and data, the user is allowed to add, retrieve or delete data from the memory 60 of the PETD apparatus 10. Voice signals are generated by the speech synthesizer 66, and are of three types. The first type is a feedback of the input information entered, the second type is the response of the PETD apparatus to the information requested, and the third type is announcements, such as menus, confirmation of the transaction requested, etc. The user will hear the voice signals over the telephone he is using.

As an additional feature, if the PETD apparatus 10 of the present invention has been accessed proximately, then the user can further instruct the PETD to dial automatically a retrieved telephone number and then further allow connection of the user to the desired party. Specifically, the microcontroller 58 can be caused to output (wide arrow 76) dialling information to DTMF generator 74. The DTMF generator 74 will convert the dialling information to DTMF signals which, when applied (wide arrow 78) to the internal telephone line segment 41, will cause a telephone number to be dialled through the RTN 26. Then the PETD apparatus 10 will also establish the caller connection to allow the conversation to happen.

PETD—Circuit

Figure 3A:
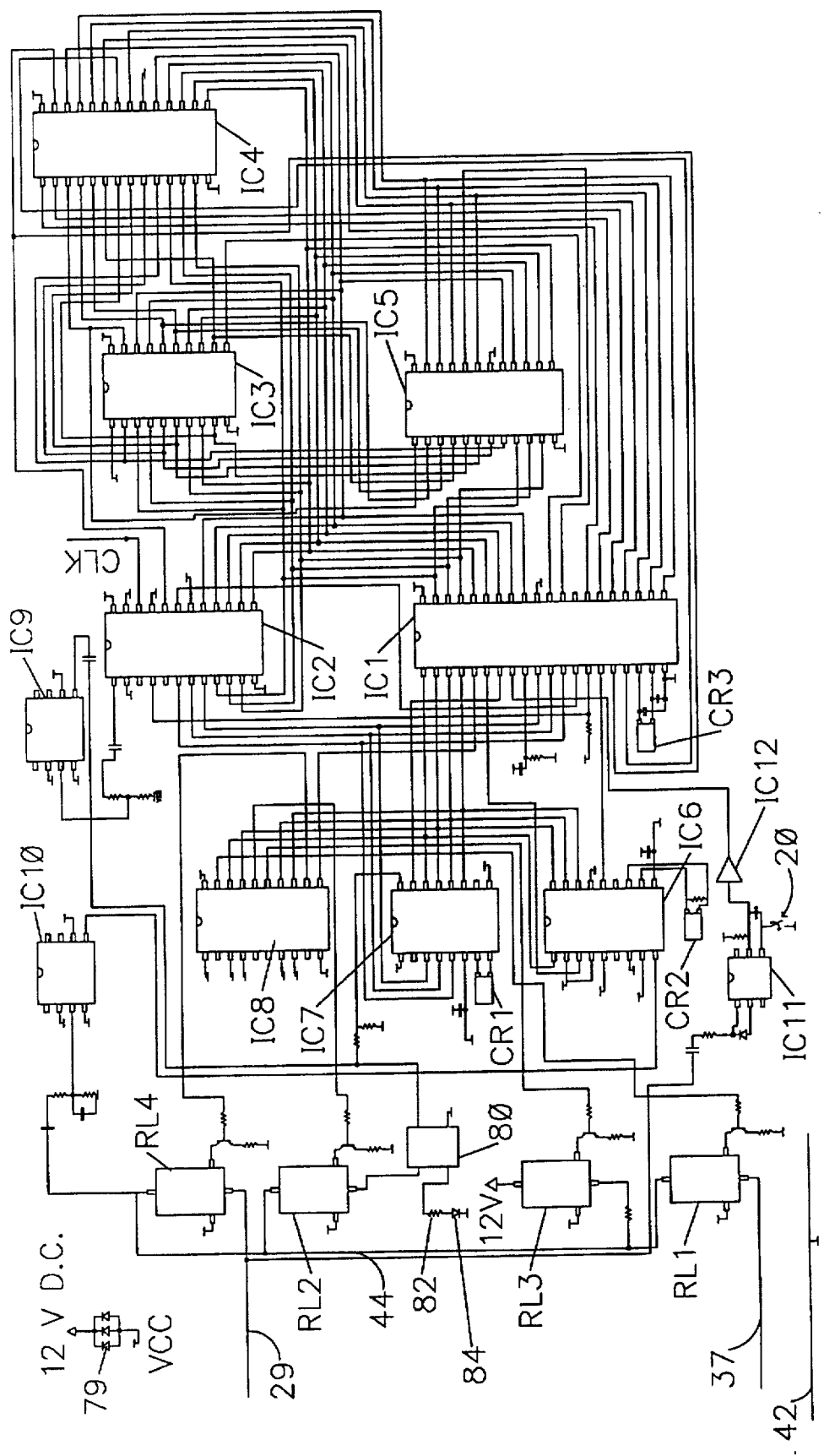
FIG. 3A is a detailed schematic implementation of a circuit of the preferred embodiment of the invention.

FIG. 3A shows a detailed schematic diagram of a circuit of the preferred embodiment of the PETD of the present invention. The person skilled in the art will recognize that there are many possible equivalent circuits, that would operate in substantially the same way as the circuit of FIG. 3A, to accomplish substantially the same result. Further, while many of the connections of the Integrated Circuits (ICs) used in the circuit of FIG. 3A are standard, only some details will be elaborated herein without loss of generality.

A 12V D.C. power supply (not shown) is used. The ground terminal of the power supply is connected to the Vss node (line 42). A group of six 6.2V Zener diodes 79 connected between the 12V supply in a reverse bias scheme provide a Vcc node of voltage of about 12V−6.2V=5.8V. Only three of the six Zener diodes 79 are shown in FIG. 3A.

The integrated circuit chips can be embodied by chips having standard part numbers. The known pin number identifications of all standard part numbers are hereby incorporated herein by reference. Pin number identifications are referred to by the designation PN, where "N" is a number identifying the pin.

The microcontroller 58 is implemented by IC1 in conjunction with IC5 and IC3. IC1 is an 8 bit microprocessor, which acts as a central processor to control the operation of the PETD apparatus. IC1 can be embodied by a chip having standard part number 8031AH. A 12 MHz crystal is connected between P18 and P19 of IC1. In addition, each of P18 and P19 of IC1 are connected to node Vss via a 33 pF capacitor. Also, 10KΩ resistor is connected between node Vss and P9 of IC1, while a 10 μF capacitor is connected between node Vcc and P9 of IC1. IC5 is a 4K×8 bits erasable programmable read only memory, and is used to store the program that the microprocessor IC1 executes. IC5 can be embodied by a chip having standard part number D2732A. IC3 is an 8 bit latch used to support the interface between IC1, IC4, and IC5. IC3 can be embodied by a chip having standard part number CD74HC373, as also can IC8.

The ring detection switch 20 enables the ring detection circuit 50 to detect rings. The ring detection circuit 50 is implemented by IC11 in conjunction with buffer IC12, as shown. IC11 can be embodied by a chip having standard part number 4N33. P1 of IC11 is connected to the signal line 29 through a 2.1KΩ resistor in series with a 0.1 µF capacitor. A reverse biased diode is connected between P1 and P2 of IC11. P5 of IC11 is connected to Vcc through a 12.1KΩ resistor. A capacitor of 220 µF is connected between P5 of IC11 and Vss. P4 of IC11 is connected to Vss via the ON/OFF ring detection switch 20. IC12 can be embodied by a chip having standard part number 74HC240N. The input of buffer IC12 is connected to P5 of IC11, and the output of buffer IC12 is connected to P8 of IC1. The data on the line sourcing from the output of buffer IC12 corresponds to the wide arrow 52 of FIG. 2.

The DTMF receiver 54 is implemented in FIG. 3A by IC10 in conjunction with IC6, and is controlled by IC1. IC10 is an amplifier of analog input from the signal line 44. IC10 can be embodied by a chip having standard part number 386N-1. P3 of IC10 is connected to the output node of a voltage divider, which is the node connecting the top and bottom portions of the voltage divider. The top portion of the voltage divider is a 0.01 µF capacitor in series with a 270KΩ resistor, and is connected to the signal line 44. The bottom portion of the voltage divider is a 1500 pF capacitor in parallel with a 33KΩ resistor, and is connected to node Vss. The output of IC10 is input into IC6.

The main chip of the DTMF receiver 54 is IC6, which converts DTMF signals to binary numbers recognized by the microcontroller 58. IC6 can be embodied by a chip having standard part number CD22202E. A 3.58 MHz crystal and a 1MΩ resistor are connected in parallel between P11 and P12 of IC6. Additionally, each of P7 and P10 of IC6 are connected to Vss.

IC4 is a 32K×8 bits static random access memory and is used as the memory 60, to store telephone directory data. IC4 can be embodied by a chip having standard part number D43256AC. In the preferred embodiment of the invention each entry in the memory 60 is allocated 32 bytes. Each byte can be used to store one alphabetic letter or two numbers. One entry, for example, can store a name consisting of 22 letters and a telephone number consisting of 20 numbers. Accordingly, an embodiment of the PETD that uses the 32K byte SRAM IC4 of FIG. 3A, can store up to 900 entries of names and telephone numbers. This number can be doubled by using a 64K byte SRAM. Further, the total number of entries can be increased by reducing the number of bytes allocated to each entry.

The speech synthesizer 66 is implemented by IC2 in conjunction with IC9. IC2, a phoneme speech synthesizer used in conjunction with IC1 to produce voice signals. IC2 can be embodied by a chip having standard part number 78A263A. P22 of IC2 is connected to a 1 MHz clock oscillator signal. A 4.7 µF capacitor is connected between P1 of IC2 and a voltage divider. The voltage divider consists of a 110KΩ and a 10KΩ resistors, with the 10KΩ resistor terminating at the Vss node.

Figure 3B:
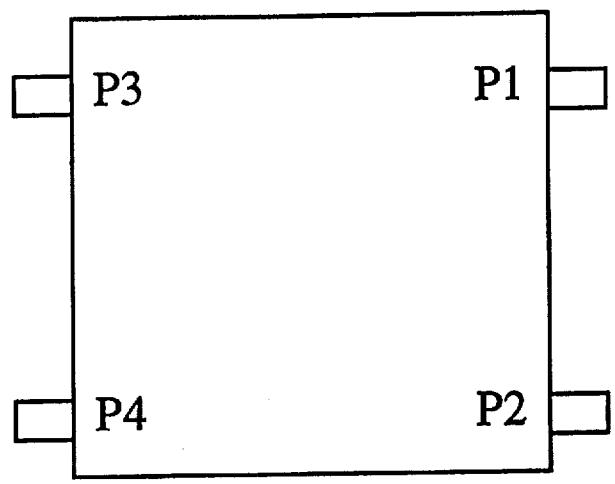
FIG. 3B is a schematic showing the pin designations of an audio transformer of the circuit of FIG. 3A.

IC9 is an amplifier that amplifies the signal output from the speech synthesizer 66. IC9 can be embodied by a chip having standard part number 386N-1. The output of the voltage divider is connected to P3 of IC9. The output pin of IC9 is P5, and the line from it corresponds to wide arrow 70 of FIG. 2. P5 of IC9 is connected through a 10 µF capacitor to one input of the primary side P1 of an audio transformer 80. FIG. 3B shows the pin designations for audio transformer 80 of FIG. 3A. The other input of the primary side P2 of the audio transformer 80 is connected to Vss. The audio transformer 80 makes possible imposing the signal from the amplifier IC9 onto the internal telephone line segment 41.

The DTMF generator 76 of FIG. 2 is implemented by IC7 of FIG. 3A. IC7 can be embodied by a chip having standard part number CD22859E. IC7 receives its input and control signals from IC1. A 3.58 MHz crystal is connected between P7 and P8 of IC7, while a 10 µF capacitor is connected between node Vcc and P6 of IC7 to reduce the power supply noise. Its output pin is P16, and the line from it corresponds to wide arrow 78 of FIG. 2. P16 is connected to Vss through a 100 Ω resistor, and it is also connected (through a 200 Ω resistor) to the same input of the primary side P1 of the audio transformer 80, as the output pin P5 of amplifier IC9.

Figure 3C:
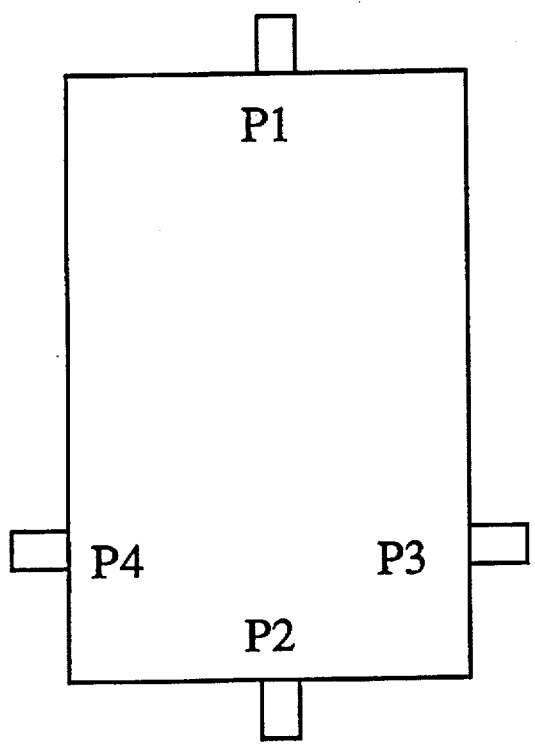
FIG. 3C is a schematic showing the pin designations of relays of the circuit of FIG. 3A.

The off hook circuit 57 is implemented by relay RL2 in conjunction with a 400 Ω resistor 82. The off hook circuit 57 has been implemented in conjunction with the audio transformer 80, although that is not necessary. FIG. 3C shows the pin designations for any one of the SPTS relays used in the circuit of FIG. 3A. The input pin P2 of relay RL2 is connected to the output pin P3 of audio transformer 80. The output pin P1 of relay RL2 is connected to the signal line 44 of the home telephone line 28. One of the pins (P4) of the secondary side of audio transformer 80 is connected through the resistor 82 to a Light Emitting Diode (LED) diode 84. The anode side of the LED diode 84 is connected to Vss.

The PETD apparatus 10 takes the home telephone line 28 to its off hook state by activating the off hook circuit 57. This is accomplished by merely closing relay RL2. The LED diode 84 lights up, when relay RL2 is turned on (closed). It stays lit until the user enters an "exit" instruction, or until no DTMF signal is detected by the PETD for a preselected amount of waiting time, as will be discussed below.

In FIG. 3A, relay 46 is implemented by RL1, and relay 48 is implemented by RL4.

Relay 84 is implemented by RL3, and is used for assisting the power requirements of telephone 34 (not shown in FIG. 3A). P1 of relay RL3 is connected to the 12V D.C. power supply, while a 100 Ω resistor is connected between P2 of relay RL3 and P1 of relay 46.

The main chip IC1 in conjunction with IC8 controls the biassing circuits of all four relays RL1, RL2, RL3, and RL4 through their biassing pins P3. Each biasing circuit consists of a 1KΩ resistor, a 200 Ω resistor and an non bipolar transistor. Additionally, pins P4 of all four relays RL1, RL2, RL3, and RL4 are connected to Vcc.

PETD—Software and Algorithm

A computer program is assembled and stored in IC5 that embodies an algorithm. The software determines the operation of the PETD. An example of such an algorithm is embodied in the flow charts of FIGS. 4 through 10. It will be apparent to a person skilled in the art that there are a number of equivalent ways for a computer program to be assembled and stored in a chip, for a microprocessor to execute. Similarly, the ideas embodied in the flow charts can be implemented in different but equivalent ways, as is known in the art. In addition, more software features can be embodied in the algorithm, as is well known in the art. In the following description of the algorithm, the simple word "PETD" is used to denote the apparatus of the present invention, however it may have been implemented.

Accessing

Figure 4:
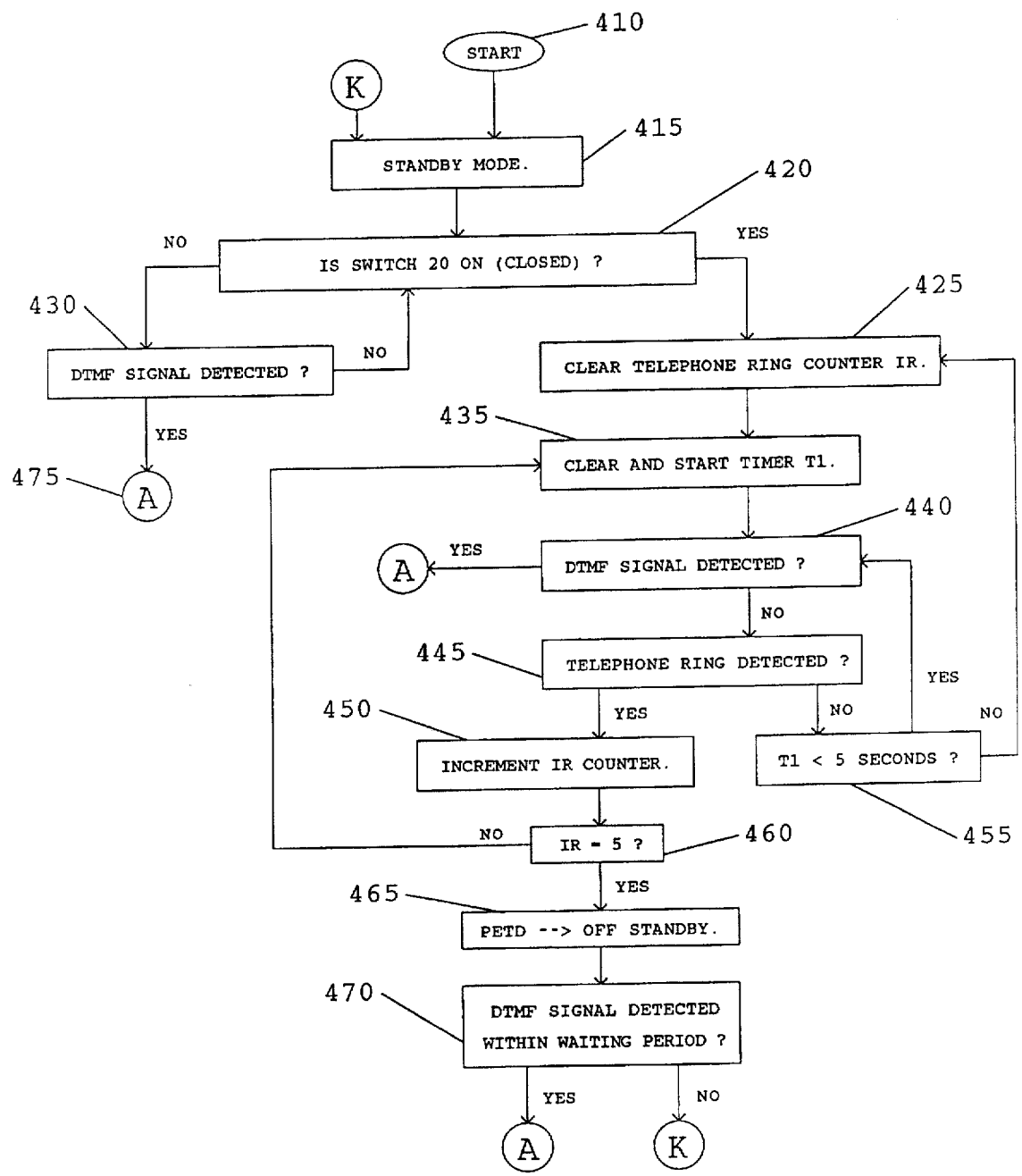
FIGS. 4, 5, 6, 7, 8, 9 and 10 are flow charts illustrating an algorithm for use with the apparatus of the present invention.

The algorithm for accessing the PETD will now be described in connection with FIGS. 4 and 5. As seen in FIG.

4, execution starts at step 410, labeled "START", which leads to step 415, the standby mode. The home telephone line 28 is assumed to start at its on hook state. Step 415 is a step to which execution continues to, if there have been no DTMF signals detected for a predetermined amount of time, as will be seen shortly.

At that time, the PETD will sample the internal telephone line segment 41 indefinitely, waiting for a DTMF input signal. The algorithm is in the loop of steps 420 and 430, if the ring detection switch 20 is open, and in the loop of steps 425, 435, 440, 445, and 455 if the ring detection switch 20 is closed.

Figure 5:
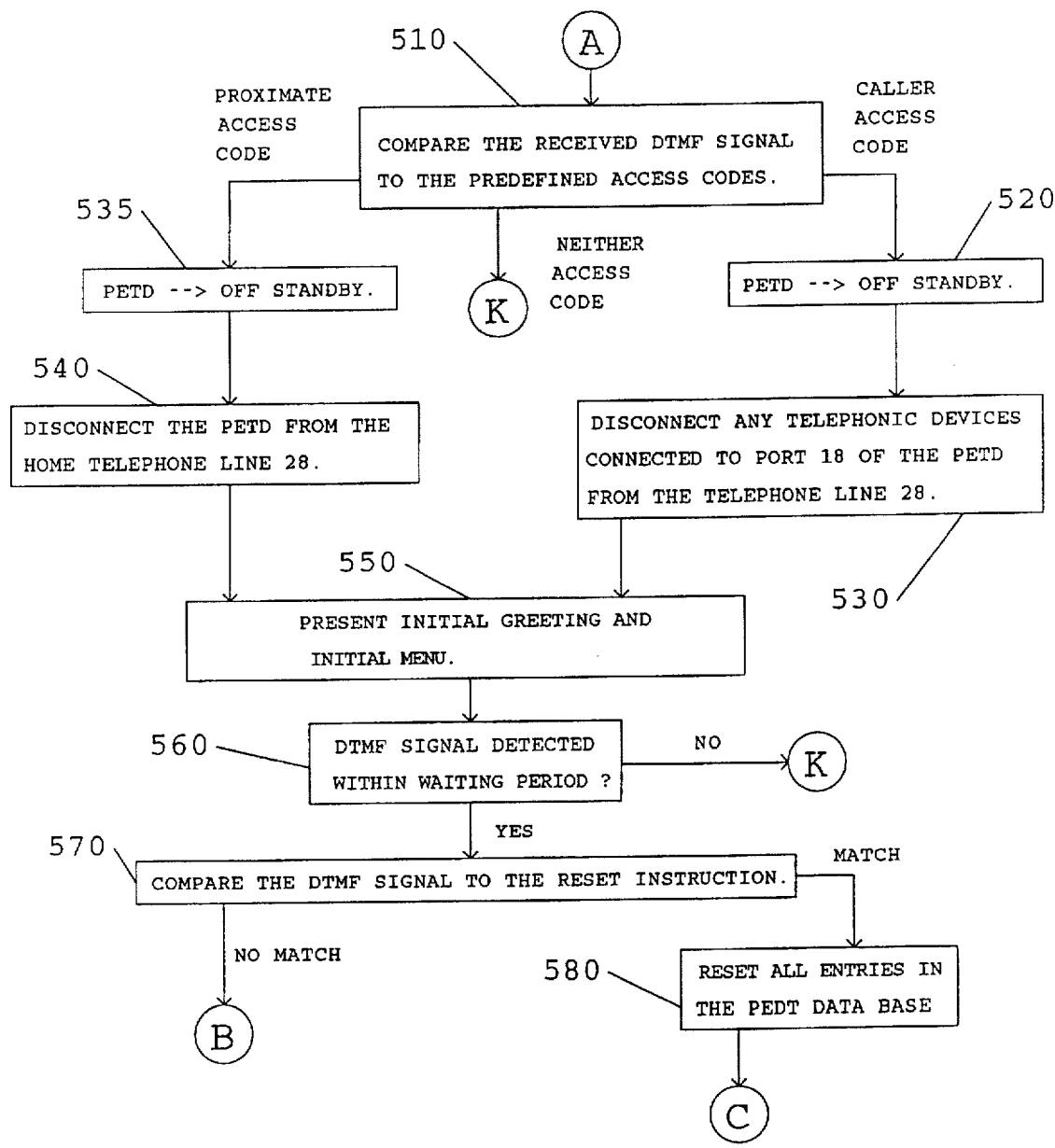

If the ring detection switch 20 is open and a DTMF signal is detected (step 430), execution proceeds to step 510 of FIG. 5, whereby the detected DTMF signal is compared to the predetermined proximate and caller access codes. Both access codes can be user programmable.

If the detected signal is indeed the proximate access code, then according to step 535, the PETD will go to its active mode, and according to step 540 the PETD will disestablish the caller connection, i.e. will disconnect itself from the home telephone line 28. Then execution proceeds to the greeting step 550, that will be described below.

If the ring detection switch 20 is closed, then the software maintains a counter (named IR) for counting telephone rings. According to step 425, the counter IR is cleared. Then a timer T1 is cleared and started (step 435). While a DTMF signal is not being detected (step 440) telephone rings will be expected (step 445) for a T1 duration of up to 5 seconds (step 455), and if they do not occur, execution will return to step 425. If a DTMF signal is detected at step 440, it will have been from local accessing only, and execution will continue to step 510.

If a telephone ring is detected at step 445, the IR counter will be incremented by one, and another telephone ring will be waited for another T1 duration, for up to five rings. When 5 rings have been detected (step 460), then the PETD will go to its active (off standby) mode (step 465). Then the PETD will wait for another DTMF signal for a predetermined waiting period (step 470). A suitable such waiting period is 70 seconds. If no DTMF signal is detected, execution will continue back to the starting step 415. If a DTMF signal is detected, then execution will continue again to step 510.

If at step 510 the DTMF signal is identified to be the caller access code, then the PETD will go to its active mode (step 520). [The PETD may have already done that at step 465.] Then execution will proceed to step 530, and the PETD will disconnect any telephonic devices connected to its proximate port 18. Then execution proceeds to the greeting step 550.

Choice of activity

Figure 6:
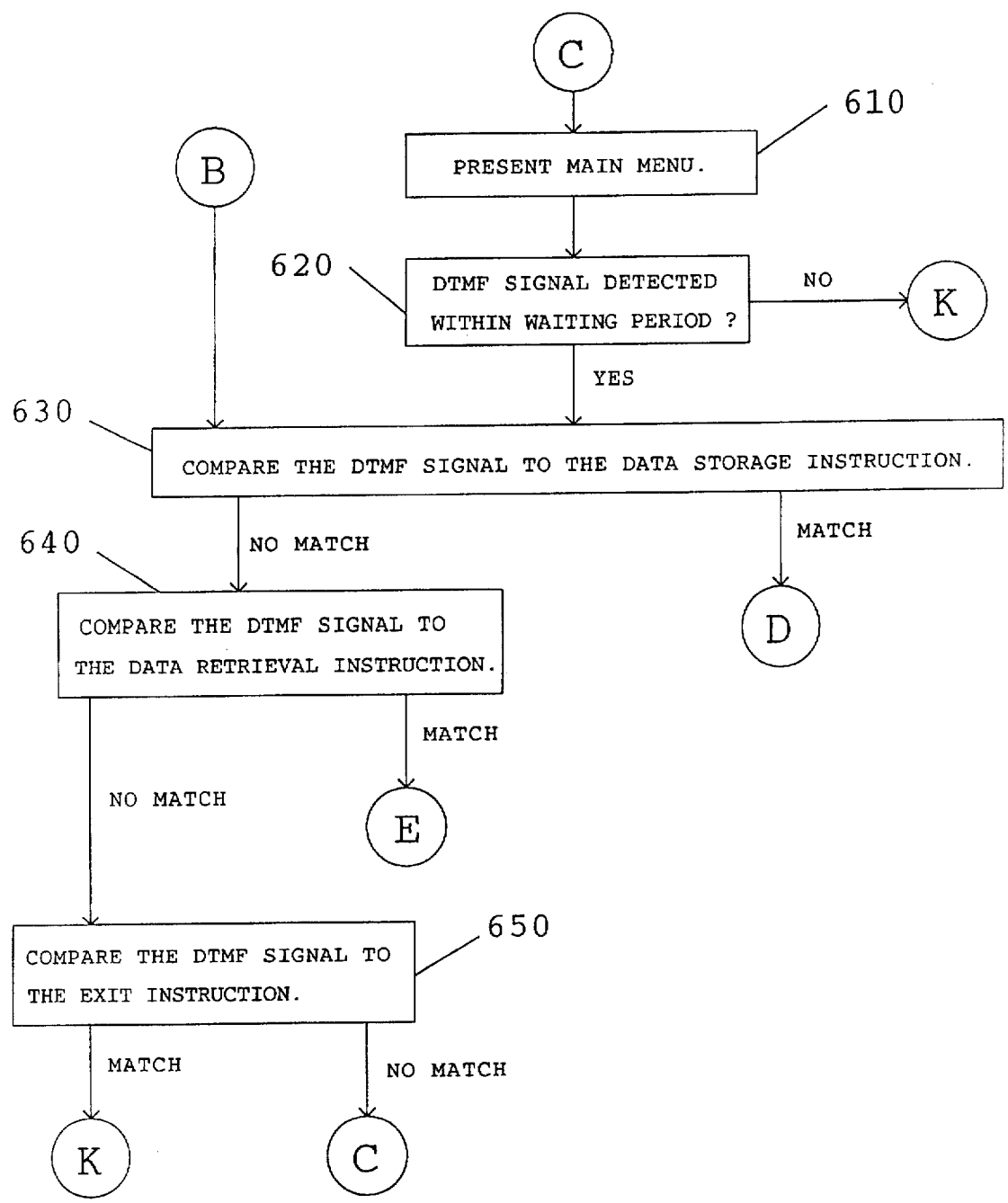

The choice of activity will now be described in reference with the flowcharts of FIGS. 5 and 6. According to the greeting step 550, the PETD gives an initial greeting and an initial menu. The initial greeting can be: "WELCOME TO YOUR PERSONAL TELEPHONE DIRECTORY." The initial menu can be: "TO RETRIEVE AN ENTRY PRESS 1, TO STORE A NEW ENTRY PRESS 2, TO RESET THE ENTIRE MEMORY PRESS 12345." This initial greeting contains the drastic option of resetting, which preferably is to be made accessible only proximately, by suitable programming. The person skilled in the art will easily discern a way to implement such a safety feature with software, exploiting that the user must have used only the proximate access code, etc.

In addition, the initial menu can contain options for changing the access codes, so that they are programmable by the user. A person having ordinary skill in the art will immediately discern ways of accomplishing this in view of the present description.

Execution will then proceed to step 560, which can be best described as "the waiting routine", and is encountered on many occasions in the software. The software will wait again for a waiting period (which can be the same period as described above), for a DTMF signal to be detected. If no signal is detected, then execution will continue to step 415. The PETD will emulate the on hook state of the telephone, etc. The waiting routine allows continuation of the algorithm if a DTMF signal is subsequently detected.

The entered DTMF signal will be compared (step 570) against the reset instruction. If there is a match, then all the telephone number data stored in the PETD memory will be erased (step 580). This activity should be performed only when the user installs the PETD or if the user desires to delete all the data stored in the PETD.

After resetting, execution proceeds to step 610. This step 610 is one to which execution returns to after a PETD transaction is completed, as will be seen from the below. According to step 610, a main menu is presented to the user, which is identical to the initial menu, except the reset option is not presented. Accordingly, the main menu could be: "TO RETRIEVE AN ENTRY PRESS 1, TO STORE A NEW ENTRY PRESS 2, TO EXIT PRESS 3." After the main menu has been presented, the waiting routine is repeated (step 620). The next detected DTMF signal is considered for choice of activity, from step 630 and on.

If the last detected DTMF signal (from step 570) were not the reset instruction, then execution proceeds to step 630 directly, without presenting the main menu. The last detected DTMF signal will be compared against the data storage instruction (step 630), the data retrieval instruction (step 640), and the exit instruction (step 650). The exit instruction will cause the PETD to go back to the on hook state (step 415). If the last detected DTMF signal does not match any of these proposed activities, then execution reverts back to step 610, and the main menu is presented again.

Data Storage

The data storage activity is where telephone number data is added to the memory. The telephone number data stored in the memory will be in pairs. Each pair comprises a name and its corresponding telephone number. It is up to the user to decide how many letters to store for any specific name. Nicknames or other usual appellations (such as "DAD") can be stored in lieu of proper names. Such is possible because the entire data file will be customized by the user. The telephone number is preferably stored in a dial ready format, for reasons that will become apparent below.

Every name is a string of letters. Since there more letters than numbers, a set of correspondences is must be chosen, with which to represent letters by numbers of the keypad. Thus each letter is inputted by pressing a corresponding pair of keys of the DTMF keypad in order, according to the chosen set of correspondences.

There are many possible sets of correspondences of letters of the alphabet to pairs of keys of the keypad. With proper programming any one set can be used. A preferred such set of correspondences is as follows: The first key is the key that contains that letter, and the second key denotes the relative position of the letter among the letters of the first key. For example, to enter the letter "C" the user would dial the "2" key then the "3" key. The "2" key is dialed since it represents "ABC" as can be seen at any DTMF telephone keypad. The "3" key is dialed since "C" is the third letter printed on the "2" key. Since the letters "Q" and "Z" are missing from most DTMF telephone keypads, in the preferred embodiment of the invention, the letter "Q" is represented by a "7" then a "4" inputs. The letter "Z" is represented by a "9" then a "4" inputs. In addition, keys can be designated for correcting an erroneous entry. Furthermore, a specific sequence of key entries is selected as the "enter" code, to denote the end of the entries. Such an "enter" code can be by merely pressing the "*" key by itself. The set of correspondences can be implemented by proper programming, as is known in the art.

Figure 7:
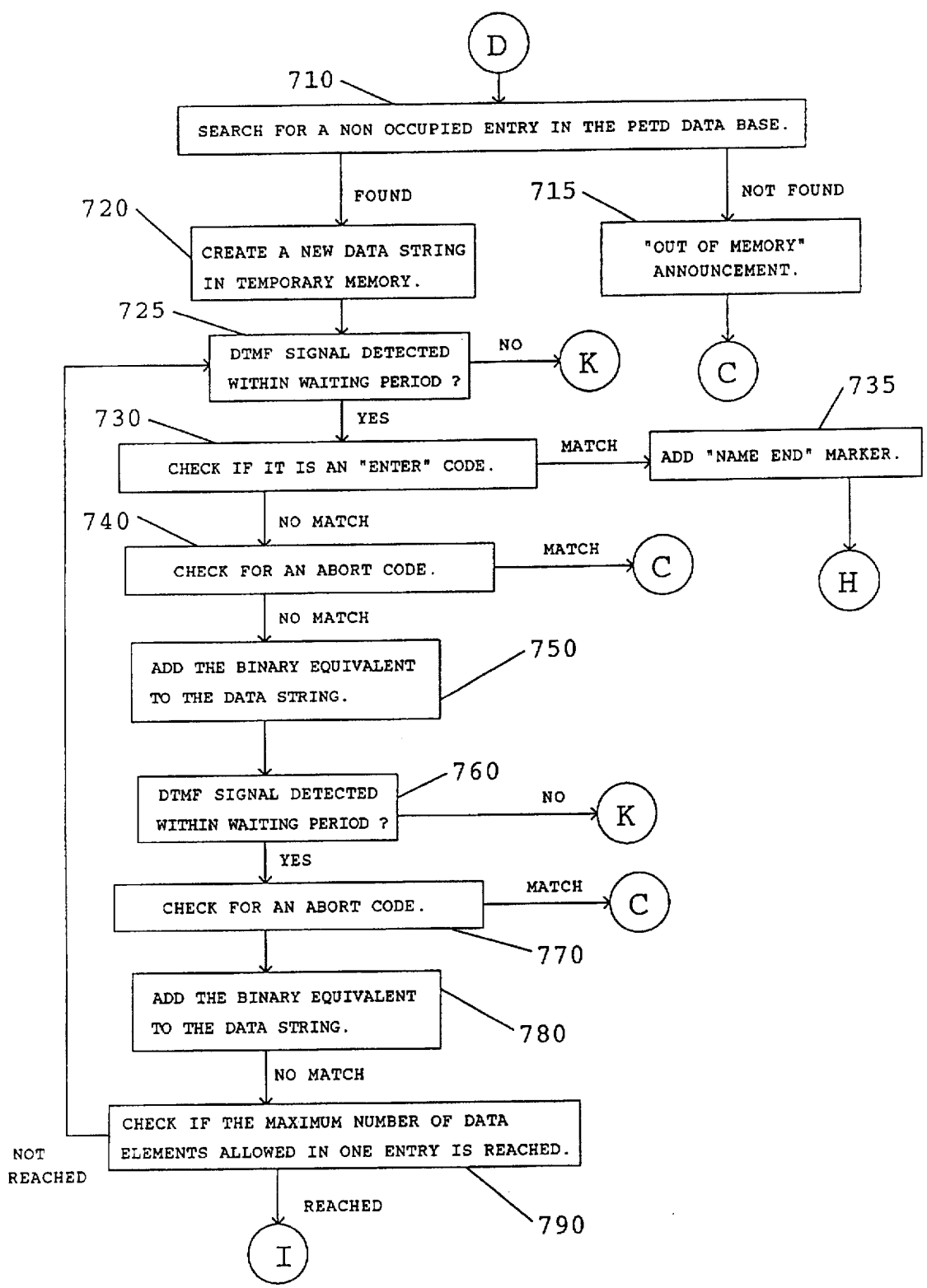
Figure 8:
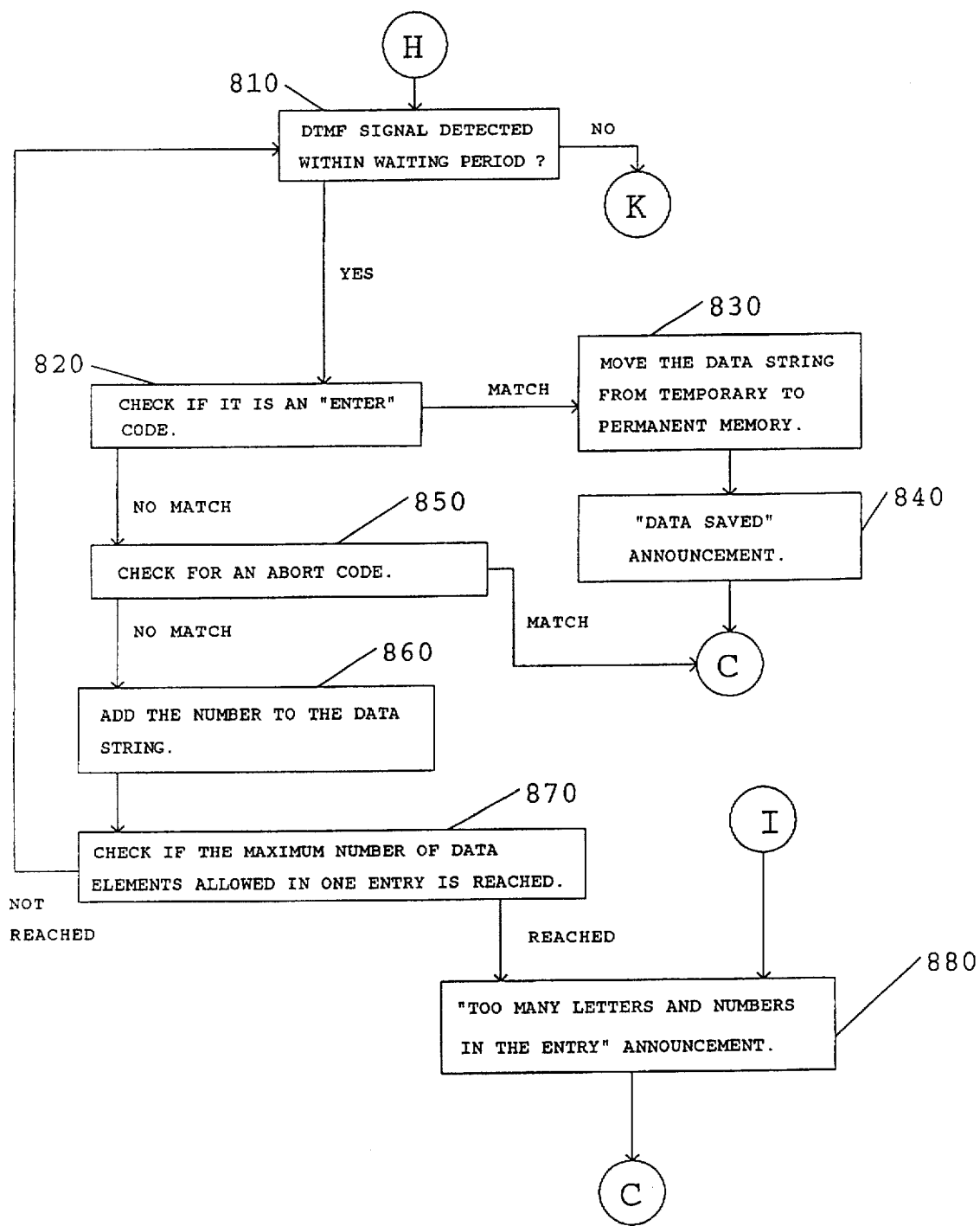
Figure 9:
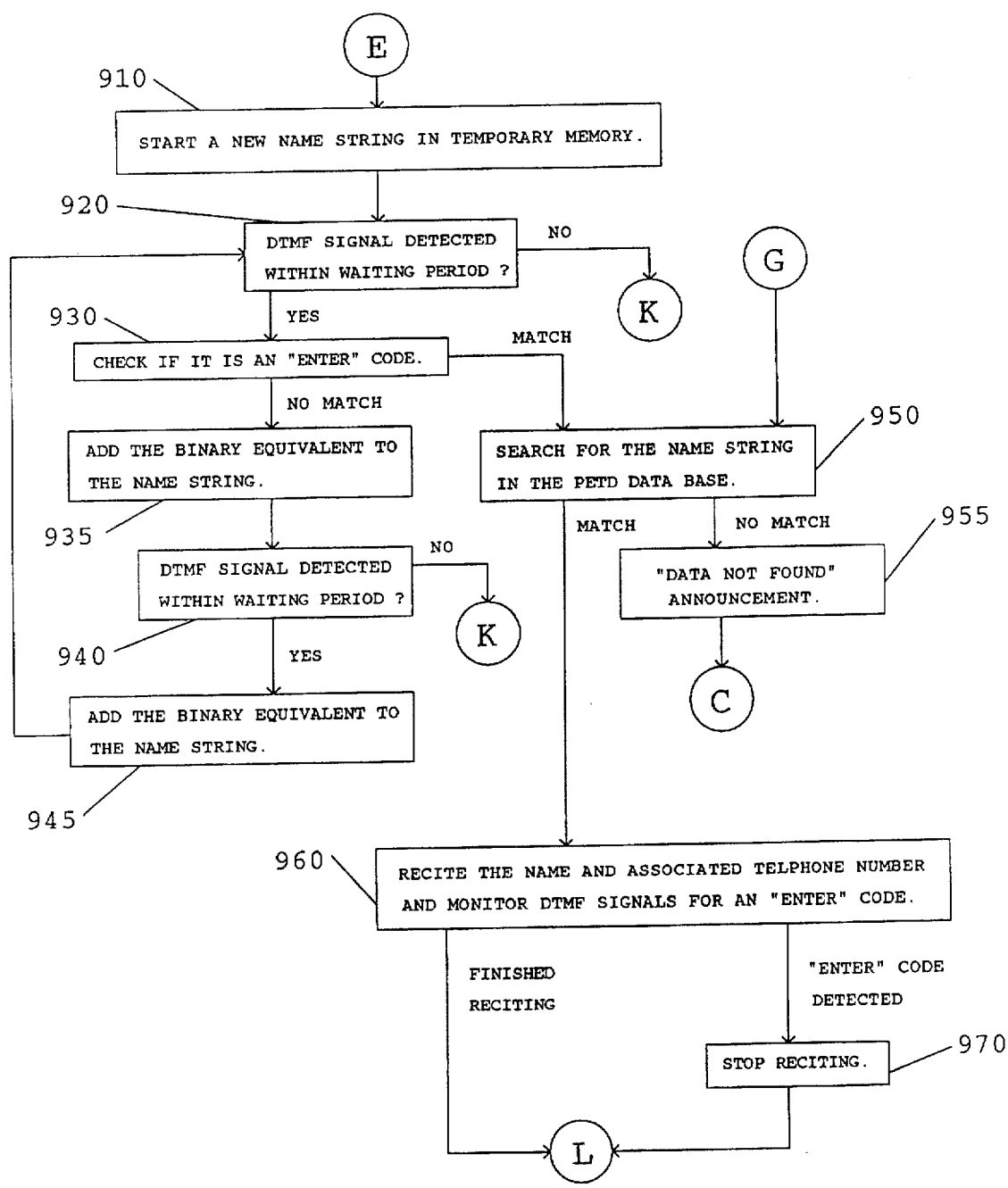

The algorithm for storing telephone number data will now be described in connection with FIGS. 7 and 8. FIG. 7 describes mostly the algorithm for storing a name (two keypad entries per letter), and FIG. 8 describes mostly the algorithm for storing a telephone number (one keypad entry per number).

According to step 710, the memory is searched for an unoccupied entry in the PETD database. If none is found, an "OUT OF MEMORY" announcement is made (step 715), and execution reverts to the main menu (step 610). If there is an unoccupied entry, then a new data string is started in the temporary memory (step 720).

Then the user makes double keypad entries for each letter of the name. Each of the keypad entries is intertwined with the waiting routine (steps 725, 760) and checking for an "abort" code (steps 740, 770). The "abort" code can be the "#" key. In addition, the first entry is checked to see if it is the "enter" code (step 730), before accepting each of the two keypad entries (steps 750, 780) in the string. The "enter" code can be the "*" key.

In addition, a check is made after making the second keypad entry (step 790), to see if the maximum allowable number of combined letters and numbers has been reached. If it has, then execution jumps to FIG. 8. A "TOO MANY LETTERS AND NUMBERS IN THE ENTRY" announcement is made (step 880), and subsequently execution reverts to the main menu (step 610).

If an "abort" code has been entered, that means that the user wants to restart or abort the entry entirely. Execution proceeds then to the main menu.

If an "enter" code has been inputted, that would signify the end of the name. The software then preferably adds a "NAME END" marker (step 735) that indicates the end of the name at that point of the data string. Such a "NAME END" marker can be a "space" or a "zero". Then the software is prepared to accept the input of the telephone number, as will be explained in connection with FIG. 8.

Then the user makes single keypad entries for each number of the telephone number. Every keypad entry is intertwined with the waiting routine (step 810) and checking for an "enter" code (step 820) and an "abort" code (step 850), before adding the number (step 860) to the data string. Again, if an "abort" code has been entered, execution returns to the main menu (step 610). Additionally, a check is made again after every keypad entry (step 870) to see if the maximum allowable number of combined letters and numbers has been reached. If it has, then execution proceeds to step 860 described above.

If an "enter" code has been inputted, that would signify the end of the telephone number. The entry is now complete. The software moves the data string from the temporary memory to the permanent memory (step 830), and then makes a "DATA SAVED" announcement (step 840). Execution then proceeds to the main menu (step 610).

Data Retrieval

Data retrieval is the activity whereby the user enters a request by inputting a name in order to hear the associated telephone number. Entry of the name request is performed according to a set of correspondences. It is highly preferable that the set of correspondences used for entering a name request is the same as is used for entering data, so that the operator does not have to learn two sets. In the preferred embodiment of the invention the two sets are the same. The algorithm for inputting such a name request will now be described in connection with FIG. 9.

According to step 910, a new name string is started in temporary memory. Then the user makes double keypad entries for each letter of the name. Each of the keypad entries is intertwined with the waiting routine (steps 920, 940). In addition, the first entry is checked to see if it is the "enter" code (step 930), before accepting each of the two keypad entries in the string. When a keypad entry is accepted, its binary equivalent is added to the name string (steps 935, 945). When the "enter" code has been entered, execution proceeds to step 950.

Step 950 is where the search happens. The name string in the temporary memory contains a name, which is compared (step 950) to all names in permanent storage that start with it. Accordingly, names that have been entered only partially will also be found. Further, if only an "enter" code has been entered, all names in the memory would have been "found" by that search at step 950. Such would be a good procedure for the periodic clearing of the memory of numbers that are no longer used. If no match to the entered name is found, the PETD apparatus will make (step 955) a "DATA NOT FOUND" announcement. Execution then will return to step 610 of present the main menu.

If a name has been found, execution proceeds to step 960, wherein the name and the associated telephone number are recited. The name is also recited for the user to confirm that she retrieved the correct name by pressing the keys of the keypad.

An additional feature allows this part of the process to take place faster. While the recitation is taking place (step 960), incoming DTMF signals are being monitored. If the user enters the "enter" code, the recitation will stop (step 970) before it is completed. Deletion of data, automatic dialling, and retrieval of more data.

Figure 10:
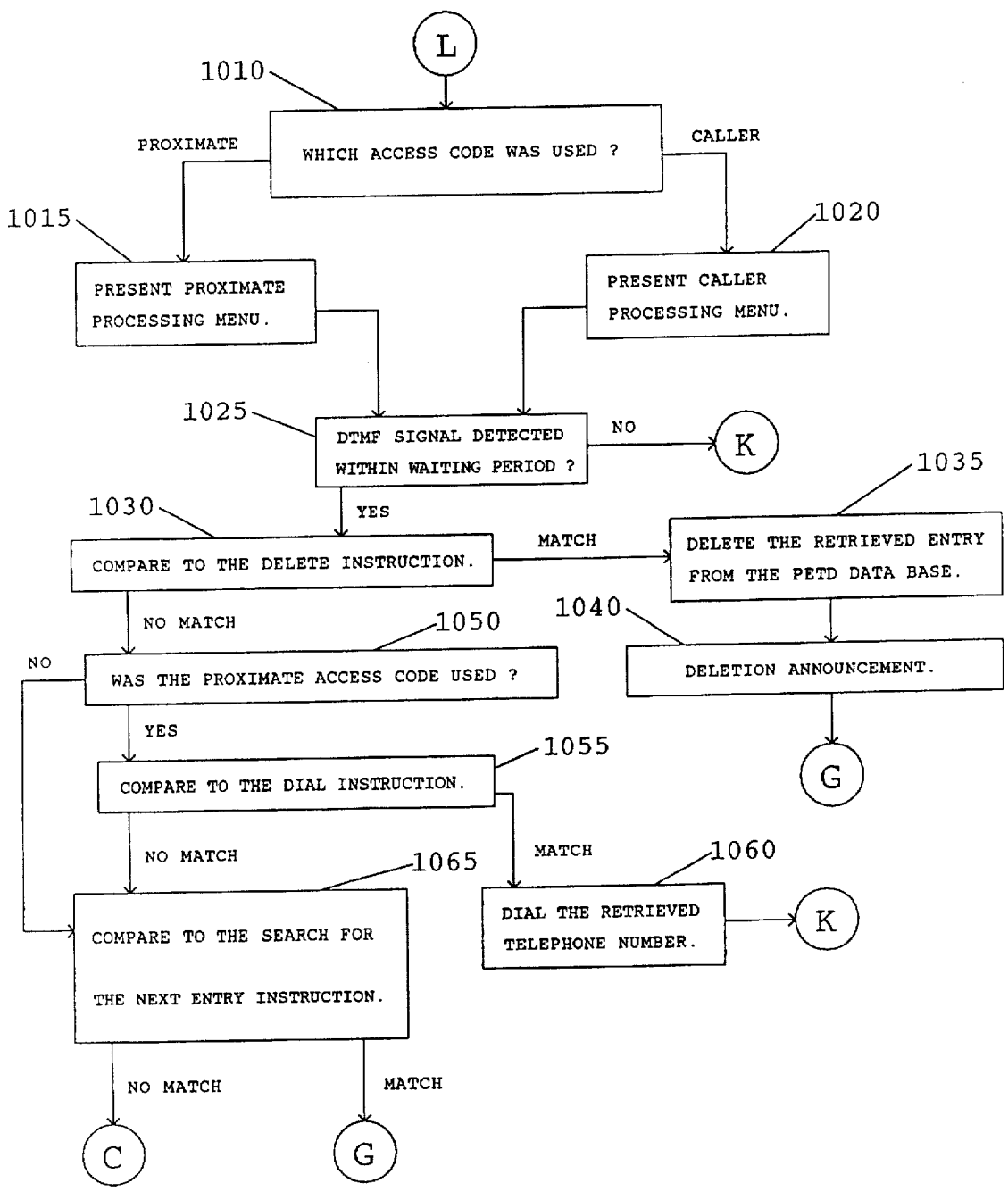

At this point of the execution, data retrieval becomes intertwined with deletion of selected data and automatic dialling, as will be seen from the following description and from FIG. 10. In other words, if the user wants to delete selected telephone number data, she must first retrieve it as described above.

Automatic dialling is a feature that is made possible by including the DTMF generator. In the circuit shown, it is available only when the user has accessed the PETD proximately. However, it would be an obvious improvement to add the automatic dialing option even when the PETD is to be accessed by its caller telephone port. Such an improvement will require a minor modification to the software program that controls the operation of the PETD. The improvement will also require that the home telephone line that the PETD is connected to can support features such as conference calling or three way calling, etc.

According to the next step 1010 of the execution, the software recalls if the originally entered access code was the proximate access code or the caller access code. Accordingly, the software will present a proximate processing menu (step 1015) or a caller processing menu (step 1020). Both menus would offer a "skip to the next entry" option, a "delete" option, and a default "exit" option. In addition, the proximate processing menu would offer the additional option of automatically dialling the retrieved telephone number. The proximate processing menu might thus be: "TO EXIT PRESS 0, TO CONTINUE WITH THE NEXT ENTRY PRESS 1, TO DELETE THIS ENTRY PRESS 2, TO DIAL IT PRESS 3". The caller accessing menu might be: "TO EXIT PRESS 0, TO CONTINUE WITH THE NEXT ENTRY PRESS 1, TO DELETE THIS ENTRY PRESS 2". Then the waiting routine would be repeated (step 1025), while the user is expected to enter a choice.

The next detected DTMF signal will be compared to the "delete" instruction (step 1030). If it is, then execution proceeds to step 1035, and the entry will be deleted from the memory. Then a deletion announcement will be made (step 1040). A number of options can follow the deletion announcement. The preferred option is for execution to continue directly with the "next search" step (step 950 of FIG. 9), so that the user can continue a presumed scanning and deletion activity.

If the next detected DTMF signal were not a "delete" instruction at step 1030, then it will be compared to the "dial" instruction (step 1055), only after it is confirmed again that the access code that was used in the first place was the proximate access code (step 1050). If it were a valid "dial" instruction, then execution will proceed to step 1060, and the telephone number will be dialled as it is contained in the database. That is why it is important that the telephone number has been stored in a dial ready format. For example, for a PETD being used in the U.S.A. and storing a telephone number in a country other than the U.S.A., the telephone number should preferably be stored with the prefix "011". Then the PETD will go to the standby mode (step 415), allowing a proximate user to continue with a call. The home telephone line 28 will not go to its on hook state, however, as it will be maintained off hook by the user.

If the next detected DTMF signal were neither a "delete" instruction nor an authorized "dial" instruction, then it will be compared to the "skip to next entry" instruction (step 1065). If it were a valid "skip to next match" instruction, then execution will continue to step 950 of FIG. 9. If not, then execution will return to step 610 of FIG. 6, to present the main menu. Thus, the "exit" option of the processing menus is implemented as a default option.

COPETD—General

The Caller Only Personal Electronic Telephone Directory ("COPETD") is an embodiment of the present invention with fewer features than the PETD apparatus 10 described above. Specifically, the COPETD apparatus lacks a proximate port and thus does not allow proximate accessing or the above described transparent operation. Its components are therefore fewer, but are identical to the equivalent components of the PETD apparatus 10, and the remaining connections are very similar.

COPETD—Components

Figure 11:
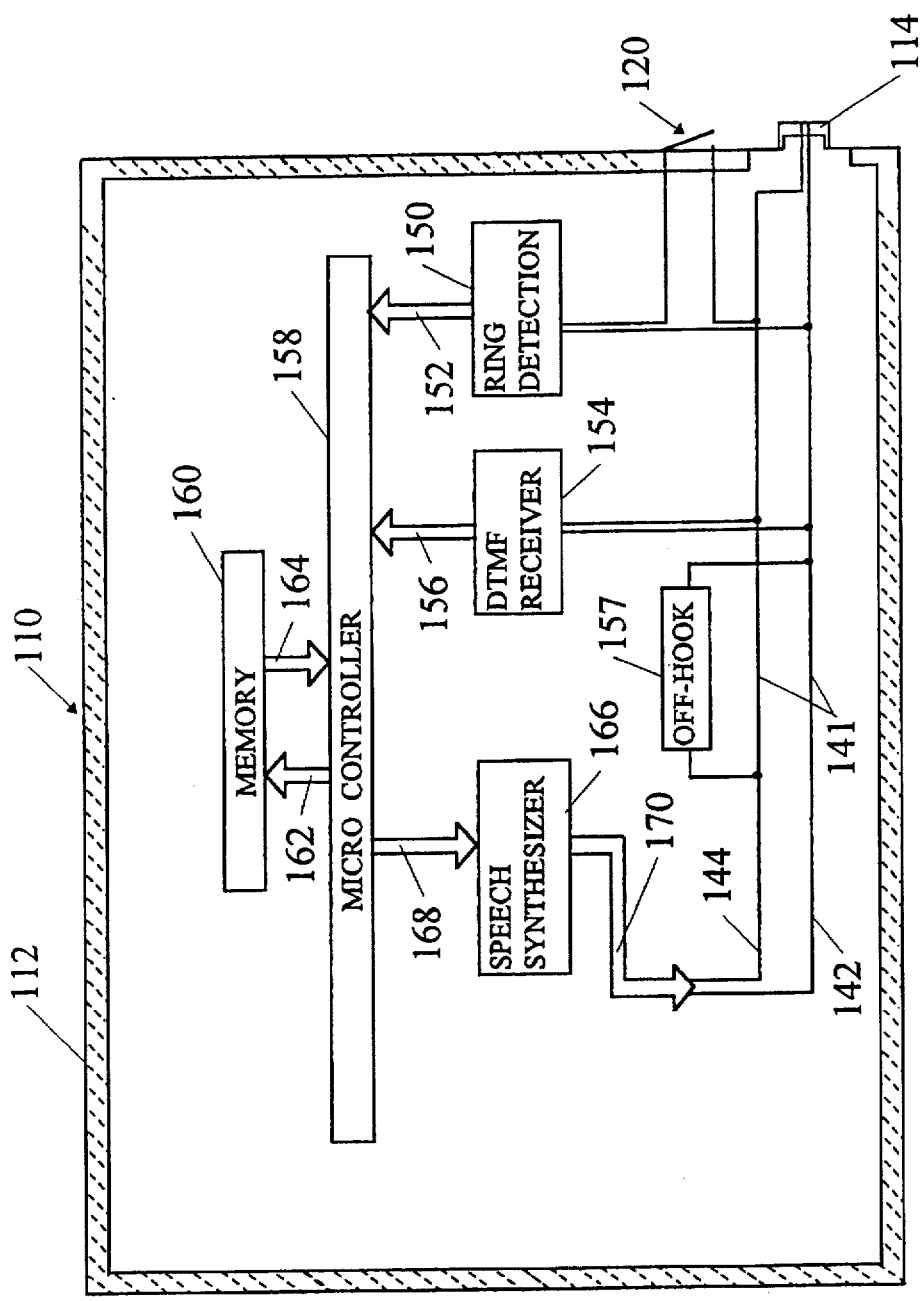
FIG. 11 is a diagrammatic illustration of components of the second embodiment of the present invention.

The main components of the COPETD apparatus 110 of the present invention will now be described in connection with FIG. 11. The COPETD apparatus 110 of the present invention is preferably provided in its own enclosure 112, that features a male telephone port 114, also known as the caller port 114.

The COPETD apparatus 110 comprises a node pair 141, comprised by a common node 142 and a signal node 144. A node is a place of connection of electrical wires. A node can be extended (i.e. a wire can be a node) without loss of generality. Common node 142 and signal node 144 are preferably implemented by electrical wires 142 and 144. Common node 142 is a common node for the Vss of the circuit of the COPETD apparatus 110, and also a common node for any home telephone line that will be subsequently connected to the node pair 141.

The caller port 114 is configured so that it is capable of establishing a caller connection of the node pair 141 with line cable 16 of FIG. 1. The preferred configuration of the caller port 114 is in the form of a common telephone plug or outlet, so that the caller connection can be made by simply plugging in.

All that was described about ring detection circuits above applies also for designing a COPETD apparatus according to the present invention. Thus, the COPETD apparatus 110 might not have its own ring detection circuit, if a telephonic device is going to be also connected to the same home telephone line as the COPETD apparatus 110.

It is preferred that the COPETD apparatus 110 have its own ring detection circuit 150, which would be identical to the ring detection circuit 50 described above in connection with FIG. 2. The input port of the ring detection circuit 150 is capable of connection with the line cable 16. This is accomplished as shown in FIG. 11, which is very similar to its counterpart in FIG. 2. A ring detection signal is produced at the output port that carries ringing information (i.e. number of rings) and is signified by wide arrow 152.

According to the same rationale as above, the stand alone COPETD apparatus 110 optionally and preferably comprises a ring detection switch 120. The ring detection switch 120 is connected to the input port of the ring detection circuit 150 and to the signal node 144. When the ring detection switch 120 is closed (ON), then the ring detection circuit 150 is enabled, and produces a ring detection signal. When the ring detection switch 120 is open (OFF), then the ring detection circuit 150 is disabled, and produces no output.

The COPETD apparatus 110 additionally comprises a DTMF receiver 154, that is identical to DTMF receiver 54 described above. The input port is connected to the node pair 141. The DTMF receiver 154 produces electronic signals at its output port in response to DTMF signals detected at its input port. The electronic signals are binary data, whose flow is shown by wide arrow 156.

The COPETD apparatus 110 also comprises an off hook circuit 157 connected to the signal node 144 and to the common node 142, and identical in function to off hook circuit 57 of FIG. 2. When activated, the off hook circuit 157 connects the signal node 144 with the common node 142 over electrical resistance. That will have the effect of taking a home telephone line connected to the node pair 141 to an off hook state.

The COPETD apparatus 110 further comprises a microcontroller 158. The microcontroller 158 acts as a central processor for all electronic components, and for the flow of commands and data within the circuit of the COPETD apparatus 110. The microcontroller 158 is connected to the output port of the ring detection circuit 150, and thus monitors the ring detection signal, when the ring detection switch 120 is closed. Further, the microcontroller 158 can activate and deactivate the off hook circuit 157.

The microcontroller 158 is connected to the output port of the DTMF receiver 154, and can thus perceive the electronic signals that flow according to arrow 156. The microcontroller 158 is programmed in such a way that it is capable of interpreting the electronic signals as encoded instructions and encoded data. The exact implementation will be obvious to a person skilled in the art, in view of the present description.

The COPETD apparatus 110 further comprises a memory 160, capable of storing telephone number data, similar to what was elaborated on above. The microcontroller 158 is connected and programmed in such a way that it is capable of retrieving, adding and deleting telephone number data from the memory 160, in accordance with the encoded instructions and the encoded data received. In particular, the microcontroller 158 stores (wide arrow 162) and retrieves (wide arrow 164) telephone number data from memory 160.

The COPETD apparatus 110 also comprises a speech synthesizer 166, identical to speech synthesizer 66 that was described above in connection with FIG. 2. The input port is connected in such a way that it is capable of perceiving telephone number data that has been retrieved from the memory 160 by the microcontroller 158. Further as a result of instruction signals received, the microcontroller 158 outputs (or commands a memory element such as a latch to output) telephone number data and perhaps other information (wide arrow 168) to speech synthesizer 166. The output port of the speech synthesizer 166 is connected to the node pair 141 through an audio transformer (not shown in FIG. 11), similarly to what was described above. Accordingly, the electronic speech signals output from the speech synthesizer 166 can be applied (wide arrow 170) to the node pair 141 as voice signals.

COPETD—Connections

The types of possible connections of the stand alone COPETD apparatus 110 of the present invention will now be described in reference with FIG. 12. The user's home or office is served by the home telephone line 28, as in FIG. 1 above. The subscriber plugs in to a first outlet 40 of the home telephone line 28 a telephonic device 32, with a telephone 38 attached to it. Or she can plug in the telephone 38 directly to the first outlet 40.

The line cable 16 is capable of connection to a second outlet 22 of the home telephone line 28. The user thus connects line cable 16 to the second outlet 22 and to the male telephone port 114.

In addition to these connections, the user would also determine whether to open or close ring detection switch 120. The user makes that determination based on whether a telephonic device is also connected to the home telephone line 28. The switch should be normally closed, unless a telephonic device is connected to any outlet (e.g. 40) of the home telephone line 28 other than the second outlet 22 that the COPETD apparatus 110 is connected to.

COPETD—Operation

The operation of the stand alone COPETD apparatus 110 will now be described in reference with FIGS. 11 and 12. When on standby mode, the COPETD apparatus 110 will not prevent the home telephone line 28 from going to its on hook state. But when the COPETD apparatus 110 goes to its off standby (i.e. active) mode, it will take the home telephone line 28 to its off hook state.

Figure 12:
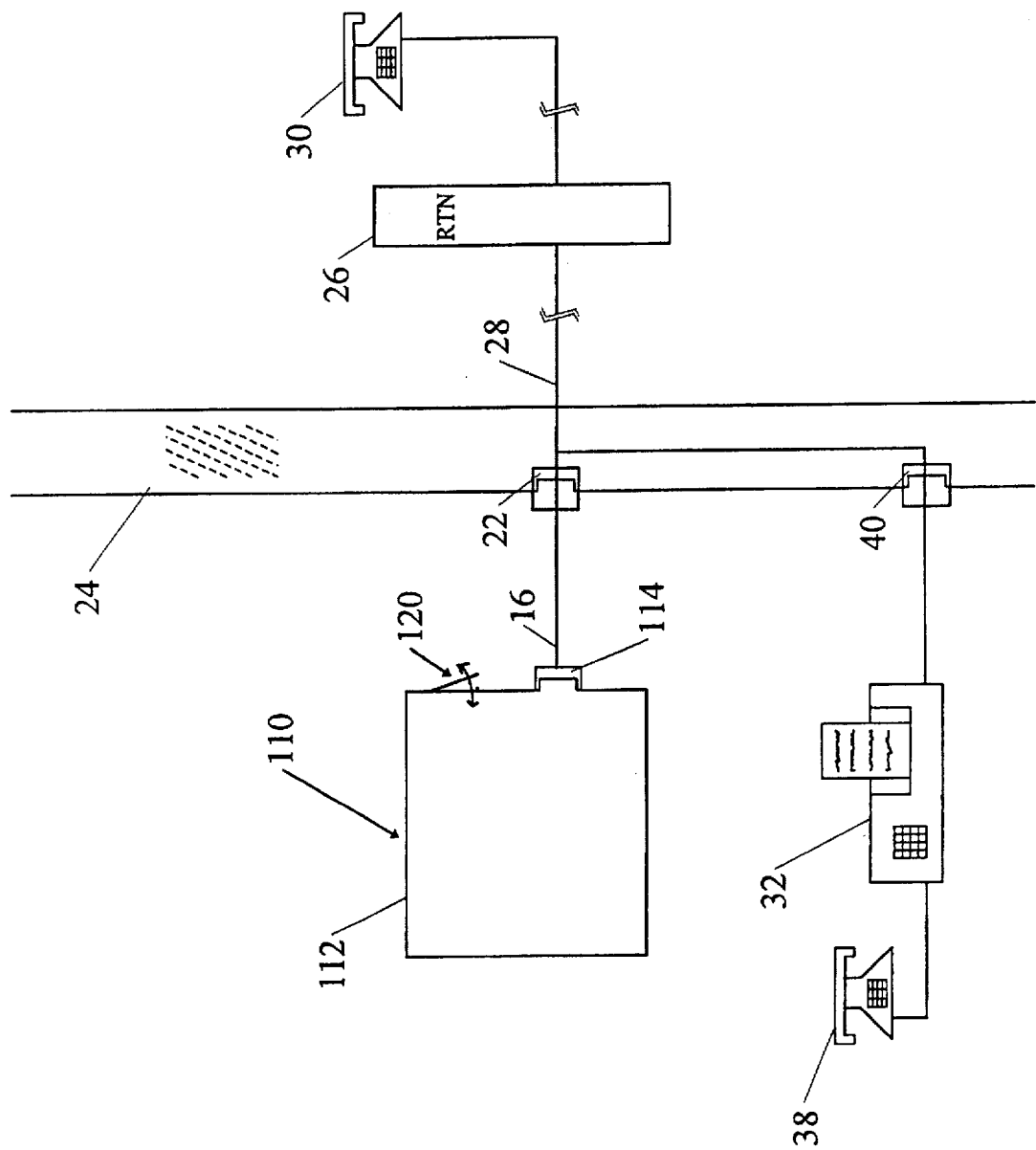
FIG. 12 is an illustration of possible connections for a second embodiment of the present invention.

Given the connections of FIG. 12, the COPETD apparatus 110 can be accessed locally by the DTMF telephone 38. The user would accomplish this by simply picking up the DTMF telephone 38, and by dialling a predefined, user programmable access code.

Alternately, the PETD apparatus of the present invention can be accessed remotely by dialling the telephone number of the home telephone line 28 from a remote telephone device 30 that is connected to RTN 26. What happens next depends on whether the ring detection switch 120 is closed or open.

If the ring detection switch 120 is closed, then the COPETD apparatus 110 monitors incoming calls through the ring detection circuit 150. When a predetermined number of rings has been detected, the PETD will answer the call by taking the home telephone line 28 to its off hook state. Thus any subsequently generated DTMF signals will be able to be applied to the node pair 141. If the predetermined number of rings is not reached, it will be because either the caller hang up, or because a telephonic device took the home telephone line 28 to its off hook state (in which case DTMF signals will be able to be applied to the node pair 141).

If the ring detection switch 120 is open, the COPETD apparatus 110 will not detect the rings. So, if no other telephonic device takes the home telephone line 28 to its off hook state, then no DTMF signals can be applied to the node pair 141, and the call will go unanswered. If telephonic device 32 takes the home telephone line 28 to its off hook state, then PETD signals will be able to be applied to the node pair 141.

When DTMF signals appear on the node pair 141, they will be detected by the DTMF Receiver 154, and subsequently by the microcontroller 58. The PETD 10 will then compare the DTMF signals to a predetermined access code. If a proper access code has been input, then the COPETD apparatus 110 will then wait for further DTMF signals from the user.

The user will be in position to access the memory of the COPETD apparatus 110 of the present invention by using the keypad of the DTMF telephone device she is using, whether locally or remotely. By sending instructions and data, the user is allowed to add, retrieve or delete data from the memory 160 of the COPETD apparatus 110. The user will hear the voice signals over the telephone she is using.

COPETD—Implementation

Given the present description and the circuit of FIG. 3A and the accompanying description it will be obvious to a person having reasonable skill in the art to come up with a circuit that will perform the function of the COPETD apparatus 110 as described above. Indeed, fewer chips are needed because fewer components are implemented.

Similarly, given the present description and the flowcharts of FIGS. 4-10, it will be obvious to a person having reasonable skill in the art to come up with an algorithm for the COPETD apparatus 110 that functions analogously to the PETD apparatus 10. Indeed, the flowcharts would be similar but simpler, because there is no dialling, only one access code, no proximate accessing, etc. Additionally, it will again be obvious to a person having reasonable skill in the art to come up with code appropriate for implementing this algorithm.

Additional Implementations

The present invention is capable of other and different embodiments without departing from its spirit. Additional implementations of the present invention will be obvious to a person skilled in the art in light of the above description. For example, the stand alone PETD or COPETD apparata of the present invention could be manufactured in conjunction with a conventional telephonic device such as a telephone answering machine.

Additionally, the components of the stand alone PETD or COPETD of the present invention can be implemented otherwise. For example, a personal computer could be configured to perform as a stand alone Personal Electronic Telephone Directory according to the present invention. Further, speech digitization and speech recognition techniques can be used to allow the storage of the required data with the user's voice, which will require more memory. Such techniques will also allow the sought name to be entered by the user vocally, instead of by using a telephone keypad. Another obvious improvement is the use of non-volatile memory or the use of battery back up techniques to retain the stored data in the memory, even if the power supply of the PETD is turned off or disconnected.

In the above description numerous details have been set forth in order to provide a more thorough understanding of the present invention. It will be obvious, however, to one skilled in the art that the present invention may be practiced without these specific details. In other instances, well known features have not been described in detail in order to not obscure unnecessarily the present invention.

What is claimed is:

1. A stand alone Personal Electronic Telephone Directory ("PETD") apparatus intended for use in combination with a telephonic device, the telephonic device being capable of automatically taking a home telephone line to an off hook state if connected to it, the stand alone PETD apparatus comprising:

an internal telephone line segment comprising a signal line and a common line, the internal telephone line segment having a proximate end and a caller end, the proximate end being configured so that it is capable of establishing a proximate connection of the internal telephone line segment with a proximate telephone cord connected to the telephonic device, the caller end being configured so that it is capable of establishing a caller connection of the internal telephone line segment with a line cable, the line cable being capable of connection with the home telephone line;

an off hook circuit connected to the signal line and to the common line;

a DTMF receiver having an input port connected to the internal telephone line segment and an output port, the DTMF receiver producing electronic signals at its output port in response to DTMF signals detected at its input port;

a memory containing at least one name that has been stored by the user in advance and telephone number data associated with each name;

a microcontroller connected to the off hook circuit, to the output port of the DTMF receiver, and to the memory, the microcontroller being capable of perceiving electronic signals at the output port of the DTMF receiver and interpreting the electronic signals as encoded data, the encoded data including a name request, the microcontroller being further capable of comparing the requested name to stored names and retrieving from the memory telephone number data corresponding to a stored name similar to the requested name; and a speech synthesizer having an output port connected to the internal telephone line segment.

2. The stand alone PETD apparatus of claim 1 additionally comprising a DTMF generator having an output port connected to the internal telephone line segment.

3. The stand alone PETD apparatus of claim 1 further comprising a ring detection circuit having an output port connected to the microcontroller and an input port capable of connection with the line cable.

4. The stand alone PETD apparatus of claim 3 additionally comprising a DTMF generator having an output port connected to the internal telephone line segment.

5. The stand alone PETD apparatus of claim 3 further comprising a switch connected to the input port of the ring detection circuit and to the line cable in such a way that the ring detection circuit is connected with the line cable when the switch is in an ON state and the ring detection circuit is disconnected from the line cable when the switch is in an OFF state.

6. The stand alone PETD apparatus of claim 5 additionally comprising a DTMF generator having an output port connected to the internal telephone line segment.

7. A stand alone Personal Electronic Telephone Directory ("PETD") apparatus comprising:

an internal telephone line segment comprising a signal line and a common line, the internal telephone line segment having a proximate end and a caller end, the proximate end being configured so that it is capable of establishing a proximate connection of the internal telephone line segment with a proximate telephone cord, the caller end being configured so that it is capable of establishing a caller connection of the internal telephone line segment with a line cable, the line cable being capable of connection with a home telephone line;

an off hook circuit connected to the signal line and to the common line;

a DTMF receiver having an input port connected to the internal telephone line segment and an output port, the DTMF receiver producing electronic signals at its output port in response to DTMF signals detected at its input port;

a ring detection circuit having an input port and an output port, the input port being capable of connection with the line cable;

a memory containing at least one name that has been stored by the user in advance and telephone number data associated with each name;

a microcontroller connected to the off hook circuit, to the output port of the DTMF receiver, to the output port of the ring detection circuit, and to the memory, the microcontroller being capable of perceiving electronic signals at the output port of the DTMF receiver and interpreting the electronic signals as encoded data, the encoded data including a requested name, the microcontroller being further capable of comparing the requested name to stored names and retrieving from the memory telephone number data corresponding to a stored name similar to the requested name; and a speech synthesizer having an output port connected to the internal telephone line segment.

8. The stand alone PETD apparatus of claim 7 additionally comprising a DTMF generator having an output port connected to the internal telephone line segment.

9. The stand alone PETD apparatus of claim 7 further comprising a switch connected to the input port of the ring detection circuit and to the line cable in such a way that the ring detection circuit is connected with the line cable when the switch is in an ON state and the ring detection circuit is disconnected from the line cable when the switch is in an OFF state.

10. The stand alone PETD apparatus of claim 9 additionally comprising a DTMF generator having an output port connected to the internal telephone line segment.

11. A stand alone Personal Electronic Telephone Directory ("PETD") apparatus intended for use in combination with a telephonic device, the telephonic device being directly connected to a first outlet of a home telephone line, the telephonic device being capable of automatically taking the home telephone line to an off hook state, the stand alone PETD apparatus comprising:

a node pair comprising a signal node and a common node, the node pair being configured so that it is capable of establishing a caller connection of the node pair with a line cable, the line cable being capable of connection to a second outlet of the home telephone line;

an off hook circuit connected to the signal node and to the common node;

a DTMF receiver having an input port connected to the node pair and an output port, the DTMF receiver producing electronic signals at its output port in response to DTMF signals detected at its input port;

a memory containing at least one name that has been stored by the user in advance and telephone number data associated with each name;

a microcontroller connected to the off hook circuit, to the output port of the DTMF receiver, and to the memory, the microcontroller being capable of perceiving electronic signals at the output port of the DTMF receiver and interpreting the electronic signals as encoded data, the encoded data including a requested name, the microcontroller being further capable of comparing the requested name to stored names and retrieving from the memory telephone number data corresponding to a stored name similar to the requested name; and a speech synthesizer having an output port connected to the node pair.

12. The stand alone PETD apparatus of claim 11 further comprising a ring detection circuit having an output port connected to the microcontroller and an input port capable of connection with the line cable.

13. The stand alone PETD apparatus of claim 12 further comprising a switch connected to the input port of the ring detection circuit and to the line cable in such a way that the ring detection circuit is connected with the line cable when the switch is in an ON state and the ring detection circuit is disconnected from the line cable when the switch is in an OFF state.

14. A stand alone Personal Electronic Telephone Directory ("PETD") apparatus comprising:

a node pair comprising a signal node and a common node, the node pair being configured so that it is capable of establishing a caller connection of the node pair with a line cable, the line cable being capable of connection with a home telephone line;

an off hook circuit connected to the signal node and to the common node;

a DTMF receiver having an input port connected to the node pair and an output port, the DTMF receiver producing electronic signals at its output port in response to DTMF signals detected at its input port;

a ring detection circuit having an input port and an output port, the input port being capable of connection with the line cable;

a memory containing at least one name that has been stored by the user in advance and telephone number data associated with each name;

a microcontroller connected to the off hook circuit, to the output port of the DTMF receiver, to the output port of the ring detection circuit, and to the memory, the microcontroller being capable of perceiving electronic signals at the output port of the DTMF receiver and interpreting the electronic signals as encoded data, the encoded data including a requested name, the microcontroller being further capable of comparing the requested name to stored names and retrieving from the memory telephone number data corresponding to a stored name similar to the requested name; and a speech synthesizer having an output port connected to the node pair.

15. The stand alone PETD apparatus of claim 14 further comprising a switch connected to the input port of the ring detection circuit and to the line cable in such a way that the ring detection circuit is connected with the line cable when the switch is in an ON state and the ring detection circuit is disconnected from the line cable when the switch is in an OFF state.

* * * * *